(12) United States Patent
Nomoto et al.

(10) Patent No.: US 12,379,619 B2
(45) Date of Patent: Aug. 5, 2025

(54) OPTICAL MODULATOR AND OPTICAL MODULATOR ARRAY

(71) Applicants: HAMAMATSU PHOTONICS K.K., Hamamatsu (JP); The University of Tokyo, Tokyo (JP)

(72) Inventors: Yoshiro Nomoto, Hamamatsu (JP); Takuo Tanemura, Tokyo (JP)

(73) Assignees: HAMAMATSU PHOTONICS K.K., Hamamatsu (JP); The University of Tokyo, Tokyo (JP)

( * ) Notice: Subject to any disclaimer, the term of this patent is extended or adjusted under 35 U.S.C. 154(b) by 294 days.

(21) Appl. No.: 18/029,461

(22) PCT Filed: Oct. 6, 2021

(86) PCT No.: PCT/JP2021/037031
§ 371 (c)(1),
(2) Date: Mar. 30, 2023

(87) PCT Pub. No.: WO2022/085455
PCT Pub. Date: Apr. 28, 2022

(65) Prior Publication Data
US 2023/0367148 A1 Nov. 16, 2023

(30) Foreign Application Priority Data
Oct. 19, 2020 (JP) .................... 2020-175346

(51) Int. Cl.
*G02F 1/065* (2006.01)
*G02B 1/00* (2006.01)
(Continued)

(52) U.S. Cl.
CPC ............. *G02F 1/065* (2013.01); *G02B 1/002* (2013.01); *G02B 1/11* (2013.01); *G02B 3/0043* (2013.01); *G02F 2201/122* (2013.01)

(58) Field of Classification Search
CPC ........ G02F 1/065; G02B 1/002; G02B 3/0043
See application file for complete search history.

(56) References Cited

U.S. PATENT DOCUMENTS

2018/0046056 A1\* 2/2018 Na .......................... G02F 1/21
2020/0116933 A1 4/2020 Akselrod et al.
(Continued)

FOREIGN PATENT DOCUMENTS

JP 2005-227760 A 8/2005
JP 2019-201065 A 11/2019
(Continued)

OTHER PUBLICATIONS

Zhang, J. et al., "Experimental Demonstration of Surface-Normal MIM Modulator with Electro-Optic Polymer," 2018 Photonics in Switching and Computing, 2018, pp. 1-3.
(Continued)

*Primary Examiner* — Rhonda S Peace
(74) *Attorney, Agent, or Firm* — Faegre Drinker Biddle & Reath LLP

(57) ABSTRACT

A light modulator includes a base layer made of an insulating material having a transmitting property for object light, a conductive pattern layer made of a conductive material, including a plurality of pattern portions arranged periodically, and formed on the base layer, a modulation layer made of an electro-optic polymer, filling a space between the plurality of pattern portions and formed on the conductive pattern layer, and having a refractive index to be changed by applying an electric field, and a reflection layer formed on the modulation layer and reflecting the object light incident from a lower surface of the base layer and transmitted through the modulation layer, and the object light having a phase modulated by being transmitted through the modulation layer and reflected by the reflection layer is output from
(Continued)

the lower surface of the base layer to the outside as modulated light.

10 Claims, 25 Drawing Sheets

(51) Int. Cl.
  *G02B 1/11* (2015.01)
  *G02B 3/00* (2006.01)

(56) References Cited

U.S. PATENT DOCUMENTS

| | | | |
|---|---|---|---|
| 2022/0019096 A1* | 1/2022 | Nomoto | G02F 1/0151 |
| 2023/0054271 A1* | 2/2023 | Miyano | G02F 1/3551 |
| 2023/0367148 A1* | 11/2023 | Nomoto | G02B 1/11 |

FOREIGN PATENT DOCUMENTS

| | | |
|---|---|---|
| JP | 2020-106706 A | 7/2020 |
| WO | WO-2007/105679 A1 | 9/2007 |
| WO | WO-2017/057700 A1 | 4/2017 |
| WO | WO-2019/111333 A1 | 6/2019 |

OTHER PUBLICATIONS

Zhang, J. et al., "Fabrication and Demonstration of a Surface-Normal Metasurface Modulator with Electro-Optic Polymer," Lecture preprints of the 66th JSAP Spring Meeting, 2019, p. 03-142.
International Preliminary Report on Patentability mailed May 4, 2023 for PCT/JP2021/037031.

* cited by examiner (a)

(b)

(a)

(b)

(a)

(b)

(a)

(b)

OPTICAL MODULATOR AND OPTICAL MODULATOR ARRAY

TECHNICAL FIELD

The present disclosure relates to a light modulator for modulating a phase of modulation object light, and a light modulator array in which light modulators are arranged in an array.

BACKGROUND ART

Patent Documents 1 and 2 disclose light modulators for modulating incident light. The light modulator described in Patent Document 1 includes a base layer, a pattern portion, and a variable refractive index portion. The base layer is formed of a first refractive index material. The pattern portion is provided on the base layer, and includes a plurality of portions formed of a conductive second refractive index material. The variable refractive index portion is formed of a third refractive index material having a refractive index to be changed by an electric field, and fills a space between the plurality of portions of the pattern portion.

The light modulator described in Patent Document 2 includes a plurality of first refractive index regions including a nonlinear optical crystal and arranged periodically in a predetermined direction, a first conductive film provided on a first side surface of the first refractive index region, and a second conductive film provided on a second side surface of the first refractive index region. Further, in the above light modulator, the plurality of first refractive index regions are surrounded by a region having a refractive index lower than that of the first refractive index region.

CITATION LIST

Patent Literature

Patent Document 1: International Publication No. 2017/057700
Patent Document 2: Japanese Patent Application Laid-Open Publication No. 2020-106706

SUMMARY OF INVENTION

Technical Problem

As a spatial light modulator (SLM) used for modulating light, for example, a liquid crystal on silicon (LCOS) type SLM for modulating a phase of light using a liquid crystal layer is used. In the configuration in which the liquid crystal layer is used for light modulation as in the LCOS type SLM, an operation speed thereof depends on a response speed of the liquid crystal, and as a result, a response speed of the light modulator is limited to, for example, less than 1 kHz.

On the other hand, in the field of laser processing, a mirror element such as a galvano mirror or a MEMS mirror may be used to sweep laser light, and in this case, an operation speed of the element is, for example, 1 kHz or more. However, an operation of the above element uses a mechanical displacement, and does not modulate a phase of light as in the LCOS type SLM. Therefore, in the above element, it is difficult to perform wavefront control with high accuracy.

An object of an embodiment is to provide a light modulator and a light modulator array capable of modulating a phase of modulation object light at high speed.

Solution to Problem

An embodiment is a light modulator. The light modulator includes (1) a base layer made of an insulating material having a transmitting property for object light being a modulation object and on which the object light is incident from a lower surface; (2) a conductive pattern layer made of a conductive material, including a plurality of pattern portions arranged periodically in a first direction perpendicular to a thickness direction of the base layer, and formed on an upper surface of the base layer; (3) a modulation layer made of an electro-optic polymer, filling a space between the plurality of pattern portions and formed on an upper surface of the conductive pattern layer with a predetermined thickness, and having a refractive index to be changed by applying an electric field using the conductive pattern layer; and (4) a reflection layer formed on an upper surface of the modulation layer and reflecting the object light being incident from the lower surface of the base layer and transmitted through the modulation layer toward the base layer, and (5) the object light having a phase modulated by being transmitted through the modulation layer, and reflected by the reflection layer is output from the lower surface of the base layer to the outside as modulated light.

In the light modulator of the above configuration, the conductive pattern layer including the plurality of pattern portions, and the modulation layer formed of the electro-optic (EO) polymer are formed on the upper surface of the insulating base layer having the light transmitting property. Further, the EO polymer layer of the modulation layer fills between the plurality of pattern portions, and further, is formed on the conductive pattern layer with the predetermined thickness. In addition, the electric field is applied to the EO polymer of the modulation layer using the plurality of pattern portions of the conductive pattern layer to change the refractive index of the modulation layer, thereby modulating the phase of the object light. According to the above configuration, phase modulation of the object light can be performed at high speed by using the EO polymer which responds faster than the liquid crystal in the modulation layer.

Further, in the above configuration, the lower surface of the base layer is used as an incident surface of the object light, and further, the reflection layer is formed on the upper surface of the modulation layer for the conductive pattern layer and the modulation layer on the base layer, and the object light having the phase being modulated by the modulation layer is reflected by the reflection layer and output as the modulated light from the lower surface of the base layer. In the above configuration, by appropriately setting configuration conditions such as a thickness of the EO polymer of the modulation layer, the modulation layer can also function as an optical resonator for the object light. Thus, it is possible to suitably realize the light modulator of a phase modulation type with high speed response using the EO polymer layer.

An embodiment is a light modulator array. The light modulator array includes a plurality of light modulators of the above configuration, and the plurality of light modulators are arranged in a one-dimensional or two-dimensional array. Further, specifically, for example, in the light modulator array, with M being an integer of 1 or more and N being an integer of 2 or more, the plurality of light modulators may be arranged in a one-dimensional or two-dimensional array in M rows and N columns. According to the above configuration, it is possible to suitably realize phase modulation of the object light by a one-dimensional or two-dimensional modulation pattern using the light modulator of the above configuration as a modulation cell (modulation pixel).

Advantageous Effects of Invention

According to the light modulator and the light modulator array of the embodiments, it is possible to suitably perform modulation of a phase of modulation object light at high speed.

DESCRIPTION OF EMBODIMENTS

Figure 1:
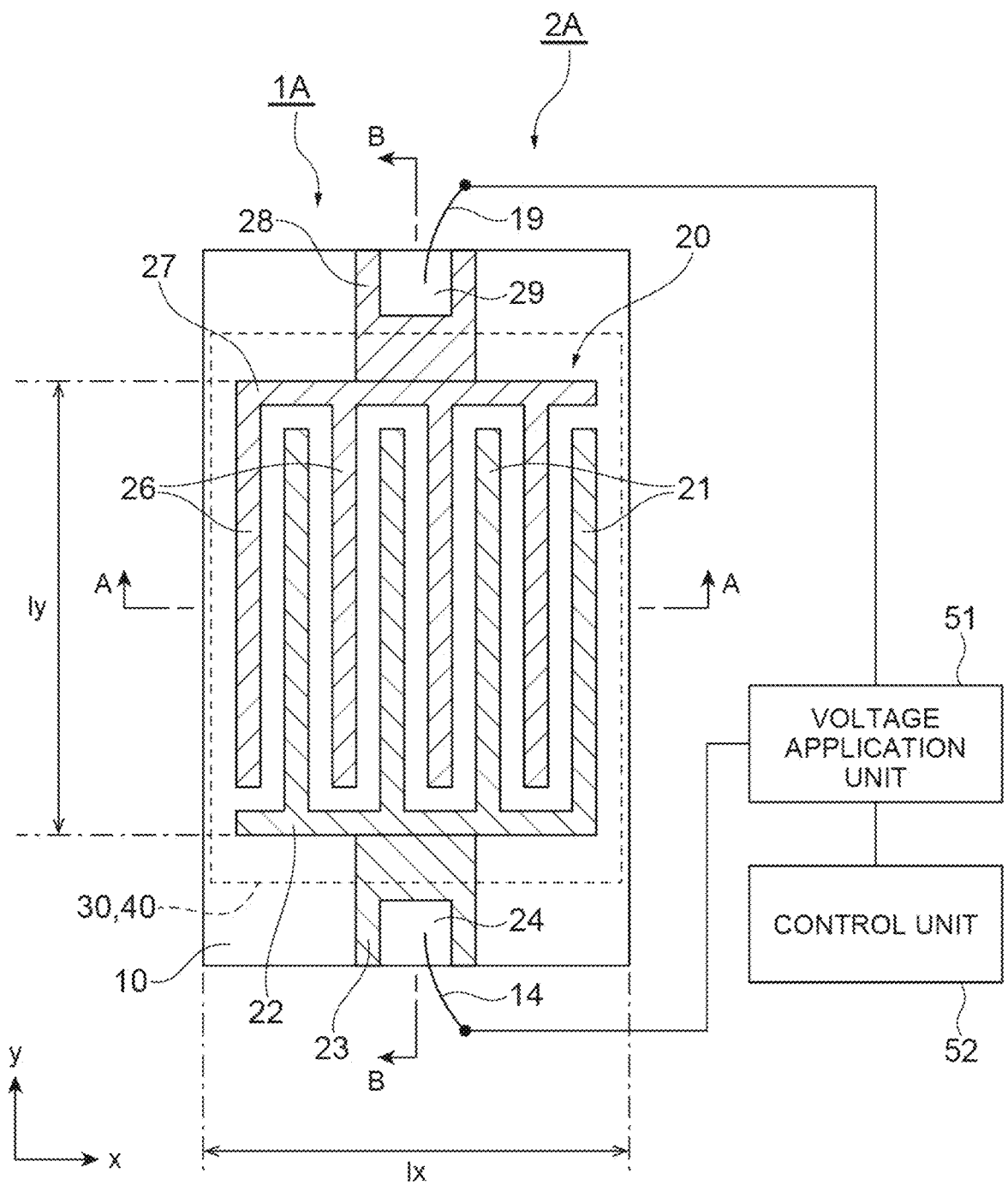
FIG. 1 is a plan view illustrating a configuration of an embodiment of a light modulation apparatus including a light modulator.

Hereinafter, embodiments of a light modulator and a light modulator array will be described in detail with reference to the accompanying drawings. In the description of the drawings, the same elements will be denoted by the same reference signs, and redundant description will be omitted. Further, the dimensional ratios in the drawings are not always coincident with those in the description.

Figure 2:
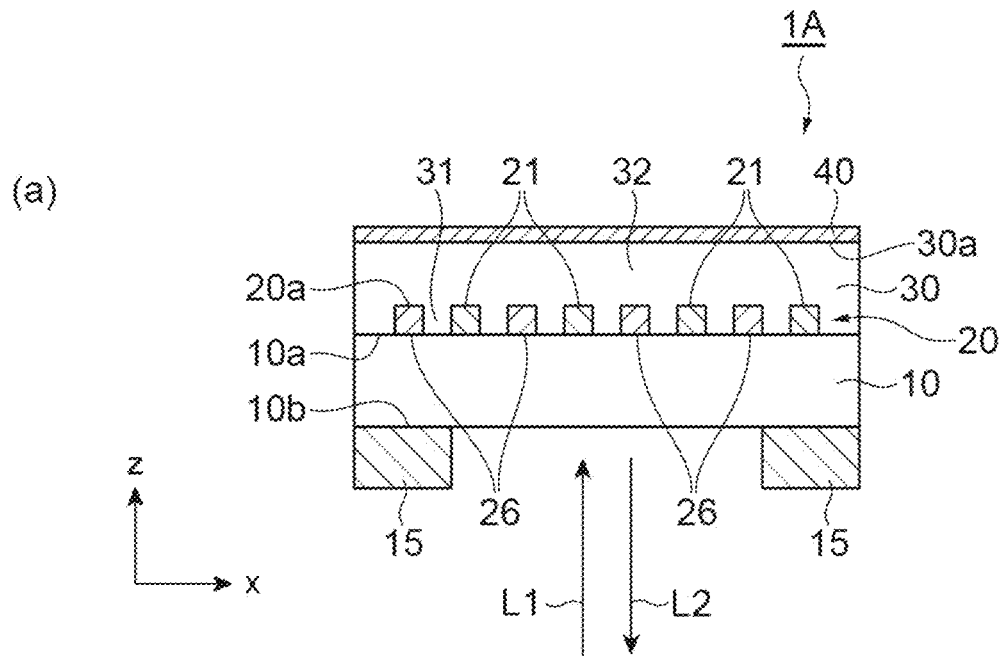
FIG. 2 includes (a) a cross-sectional side view taken along a line A-A, and (b) a cross-sectional side view taken along a line B-B, illustrating the configuration of the light modulator illustrated in FIG. 1.
Figure 2:
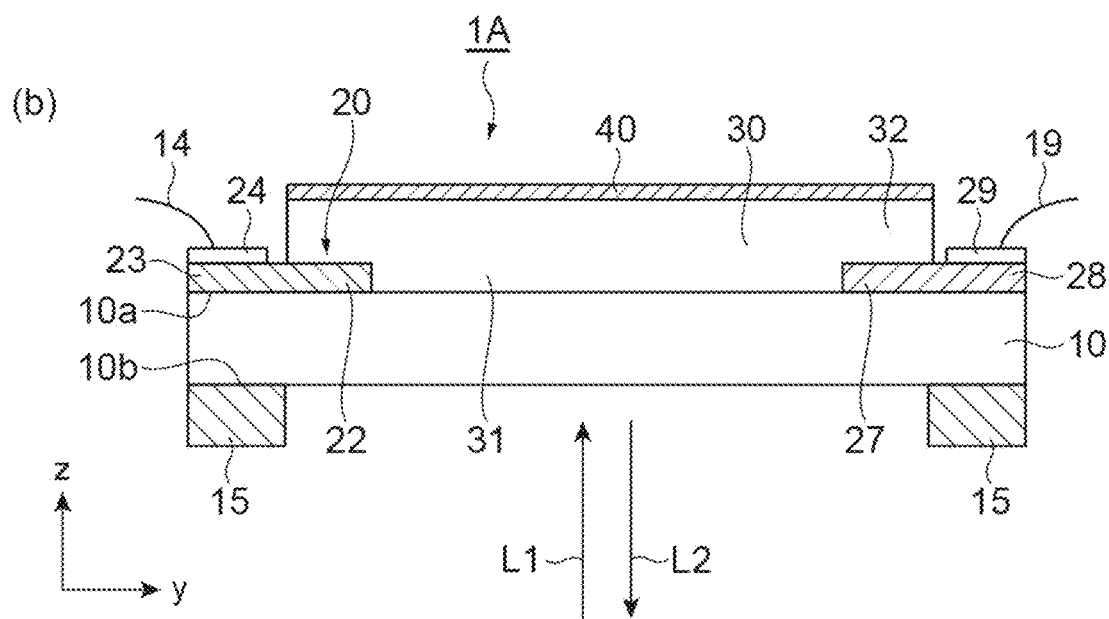
Figure 3:
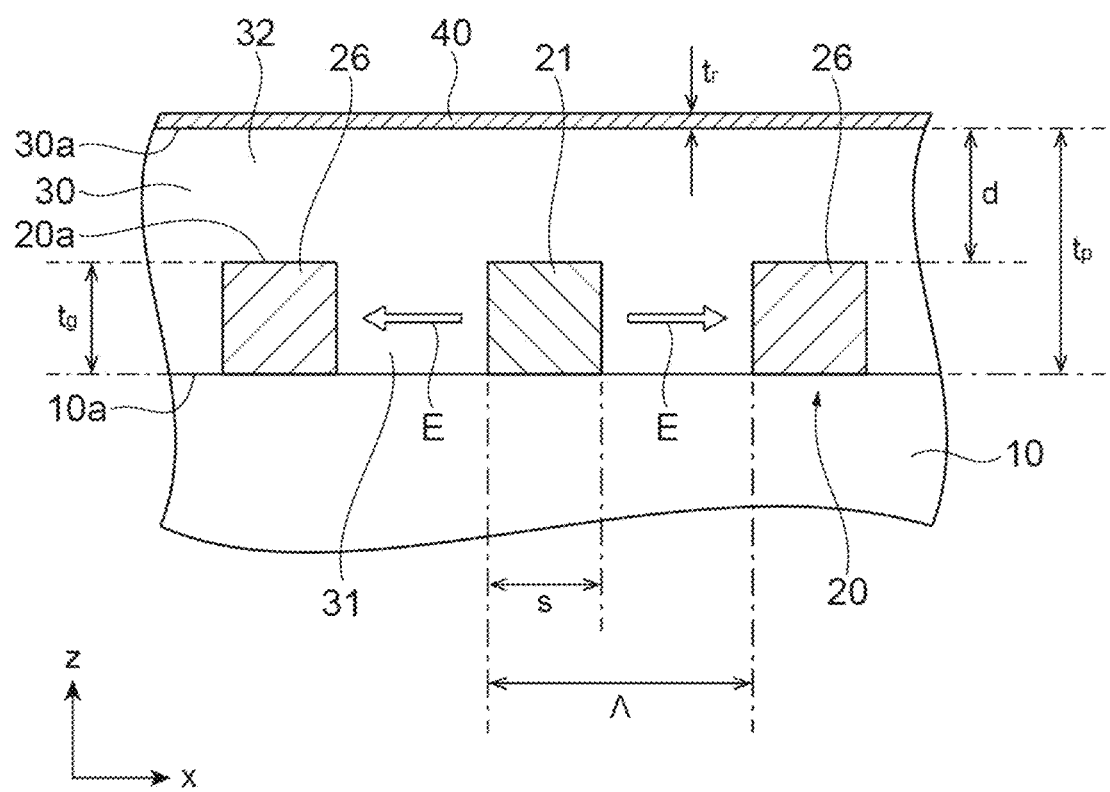
FIG. 3 is a partially enlarged view of the configuration of the light modulator illustrated in (a) in FIG. 2.

FIG. 1 is a plan view illustrating a configuration of an embodiment of a light modulation apparatus including a light modulator. FIG. 2 includes diagrams illustrating the configuration of the light modulator illustrated in FIG. 1, and (a) in FIG. 2 illustrates a cross-sectional side view taken along a line A-A, and (b) in FIG. 2 illustrates a cross-sectional side view taken along a line B-B. Further, FIG. 3 is a partially enlarged view of the configuration of the light modulator illustrated in (a) in FIG. 2.

In addition, in the following drawings, an xyz orthogonal coordinate system is also illustrated for ease of description. In the coordinate system, a z-axis indicates a thickness direction of the light modulator (thickness direction of a base layer constituting the light modulator), and indicates a stack direction of respective layers constituting the light modulator. Further, an x-axis indicates a first direction perpendicular to the thickness direction. Further, a y-axis indicates a second direction perpendicular to the thickness direction and the first direction.

A light modulation apparatus 2A according to the present embodiment includes a light modulator 1A, a voltage application unit 51, and a control unit 52. Further, the light modulator 1A is a device for performing phase modulation on object light L1 incident as a modulation object, and outputting modulated light L2 to the outside, and includes a base layer 10, a conductive pattern layer 20, a modulation layer 30, and a reflection layer 40. In addition, in FIG. 1, a region where the modulation layer 30 and the reflection layer 40 are provided is indicated by a dashed line.

The base layer 10 is a substrate made of an insulating material having a transmitting property for the object light L1, and a lower surface 10*b* thereof is used as an incident surface on which the object light L1 is incident. As the insulating material constituting the base layer 10, for example, a dielectric material having a refractive index lower than that of a conductive material constituting the conductive pattern layer 20 and having the transmitting property for the object light L1 may be used, and preferably, a quartz ($SiO_2$) glass material may be used. Further, as the insulating material of the base layer 10, for example, dielectric materials such as $TiO_2$, $Al_2O_3$, $Nb_2O_5$, $MgF_2$, and $Ta_2O_5$ may be used, in addition to $SiO_2$.

The conductive pattern layer 20 is made of a conductive material, and is formed on an upper surface 10a of the base layer 10 with a predetermined pattern. The conductive pattern layer 20 is used for an electric field application (voltage application) to the modulation layer 30. The conductive material constituting the conductive pattern layer 20 is preferably a semiconductor material, and for example, Si is used. Further, examples of the conductive material of the conductive pattern layer 20 include single element semiconductor materials such as Si and Ge, III-V compound semiconductor materials (binary mixed crystal semiconductor materials) such as GaAs, InP, InAs, GaP, AlP, GaN, and AlN, II-VI compound semiconductor materials such as ZnS and ZnSe, IV-IV compound semiconductor materials such as SiC and SiGe, ternary mixed crystal semiconductor materials such as InGaAs, InGaN, and AlGaN, quaternary mixed crystal semiconductor materials such as InGaAsP and GaInNAs, and transparent conductive film materials such as ITO, AZO, IZO, IGZO, GZO, ATO, NTO, and TTO. Further, a metal material may be used as the conductive material of the conductive pattern layer 20.

The conductive pattern layer 20 is formed to include a plurality of pattern portions arranged periodically in the x-axis direction as the predetermined pattern. In the configuration example illustrated in FIG. 1 and FIG. 2, specifically, the conductive pattern layer 20 is formed with a grating pattern in which a plurality of (four in the drawing) first pattern portions 21 extending in the y-axis direction and a plurality of (four in the drawing) second pattern portions 26 extending in the y-axis direction are arranged alternately in the x-axis direction as the plurality of pattern portions. In addition, the plurality of pattern portions in the conductive pattern layer 20 can be formed by, for example, a microfabrication process used in the semiconductor manufacturing.

The first pattern portions 21 are electrically coupled to a first electrode pattern portion 23 via a first connection pattern portion 22 formed on one side in the y-axis direction (lower side in the drawing) on the base layer 10. Further, a first electrode 24 is formed on the first electrode pattern portion 23, and a wire 14 is connected to the first electrode 24. By the above configuration, a first voltage is applied to the first pattern portions 21 via the wire 14 and the first electrode 24.

The second pattern portions 26 are electrically coupled to a second electrode pattern portion 28 via a second connection pattern portion 27 formed on the other side in the y-axis direction (upper side in the drawing) on the base layer 10. Further, a second electrode 29 is formed on the second electrode pattern portion 28, and a wire 19 is connected to the second electrode 29. By the above configuration, a second voltage different from the first voltage is applied to the second pattern portions 26 via the wire 19 and the second electrode 29. As a material of the first and second electrodes 24 and 29, a metal material may be used, and for example, Cr/Au is used.

The modulation layer 30 is formed as an electro-optic (EO) polymer layer made of an EO polymer to cover the base layer 10 and the conductive pattern layer 20. Specifically, as illustrated in FIG. 2, the modulation layer 30 is formed to include a filling portion 31 filling a space between the pattern portions 21 and 26 of the conductive pattern layer 20, and a spacer portion 32 formed on an upper surface 20a of the conductive pattern layer 20 with a predetermined thickness.

In the modulation layer 30, in particular, in the filling portion 31 in the region interposed between the first and second pattern portions 21 and 26 of the conductive pattern layer 20, as described later, a refractive index of the EO polymer changes due to the electric field application (voltage application) using the conductive pattern layer 20. In the light modulator 1A according to the present embodiment, modulation of the phase of the object light L1 is performed by using the above change of the refractive index in the modulation layer 30. Further, the modulation layer 30 having the filling portion 31 and the spacer portion 32 as described above can be formed by applying the EO polymer having the electro-optic effect by a desired thickness on the base layer 10 with the pattern portions 21 and 26 of the conductive pattern layer 20 formed thereon by a spin coating, and removing organic materials in the EO polymer by a baking process to solidify, for example.

The reflection layer 40 is formed on an upper surface 30a of the modulation layer 30. As a material of the reflection layer 40, a metal material may be used, and for example, Au (gold) is used. Further, as the material of the reflection layer 40, metal materials such as Al (aluminum), Ag (silver), Pt (platinum), Ti (titanium), and Cr (chromium) may be used, in addition to Au. Further, instead of the metal layer, for example, a dielectric multilayer film may be used as the reflection layer 40.

The reflection layer 40 reflects the object light L1, being incident from the lower surface 10b of the base layer 10 and transmitted through the modulation layer 30 of the EO polymer, toward the base layer 10. By the above configuration, the light modulator 1A of the present embodiment is configured as a reflection type light modulator which outputs the modulation object light L1, having the phase modulated by being transmitted through the modulation layer 30 and reflected by the reflection layer 40, from the lower surface 10b of the base layer 10 to the outside as the modulated light L2. Further, the light modulator 1A is, if necessary, mounted on a mount 15 having an opening or an incident window through which the object light L1 and the modulated light L2 are passed.

In the light modulation apparatus 2A, as illustrated in FIG. 1, the voltage application unit 51 and the control unit 52 are provided for the light modulator 1A of the above configuration. One terminal of the voltage application unit 51 is electrically coupled to the first electrode 24 via the wire 14, and the other terminal is electrically coupled to the second electrode 29 via the wire 19. Thus, the first and second voltages are applied from the voltage application unit 51 to the first and second pattern portions 21 and 26 in the conductive pattern layer 20 of the light modulator 1A, respectively.

The control unit 52 controls a phase modulation operation for the modulation object light L1 in the light modulator 1A by controlling a voltage application operation (electric field application operation) to the light modulator 1A by the voltage application unit 51. In the above configuration, as the voltage application unit 51, for example, a power supply device may be used. Further, as the control unit 52, for example, a computer including a CPU, a storage unit, a display unit, an input unit, and the like may be used.

In the light modulator 1A, a region in which the first and second pattern portions 21 and 26 of the conductive pattern layer 20 are provided functions as a modulation region for modulating the phase of the object light L1. In the configuration example of FIG. 1, a width of the modulation region in the x-axis direction is lx, and a width in the y-axis direction is ly. The above modulation region serves as a unit modulation cell when a light modulator array is configured as described later, and a cell size thereof is, for example, lx×ly=100 μm×100 μm.

Further, as illustrated in FIG. 3, in the light modulator 1A, a width of the pattern portion in the grating pattern by the first and second pattern portions 21 and 26 of the conductive pattern layer 20 is set to s, a height is set to tg, and an arrangement period is set to Λ. A cross-sectional shape of each pattern portion in the conductive pattern layer 20 may be an arbitrary shape depending on specific design conditions and fabrication conditions, and is, for example, a rectangular shape, a trapezoidal shape, or a rectangular or trapezoidal shape having rounded vertices.

Further, for the modulation layer 30, a thickness of the spacer portion 32 between the upper surface 20a of the conductive pattern layer 20 and the upper surface 30a of the modulation layer 30 is set to d, and a total thickness of the EO polymer of the modulation layer 30 including the filling portion 31 and the spacer portion 32 is set to tp. Further, a thickness of the metal layer of the reflection layer 40 is set to tr.

In the light modulator 1A having the above configuration, the arrangement period Λ of the first and second pattern portions 21 and 26 in the conductive pattern layer 20 is preferably set to be less than a wavelength λ of the object light L1 being the object of the phase modulation. As described above, in the pattern portions 21 and 26 of the conductive pattern layer 20 arranged on the base layer 10, and the modulation layer 30 filling the spaces between the pattern portions 21 and 26, by using a subwavelength structure (metasurface structure) in which the arrangement period Λ is set to be smaller than the object wavelength λ, it is possible to suppress generation of high-order diffracted light, and suitably realize the phase modulation of the object light L1 using the modulation layer 30 of the EO polymer. Further, in the configuration using the subwavelength structure, the modulation cell can be downsized and integrated, and further, the size of the modulation pixel can be made smaller than that in the LCOS type SLM using the liquid crystal layer.

Figure 4:
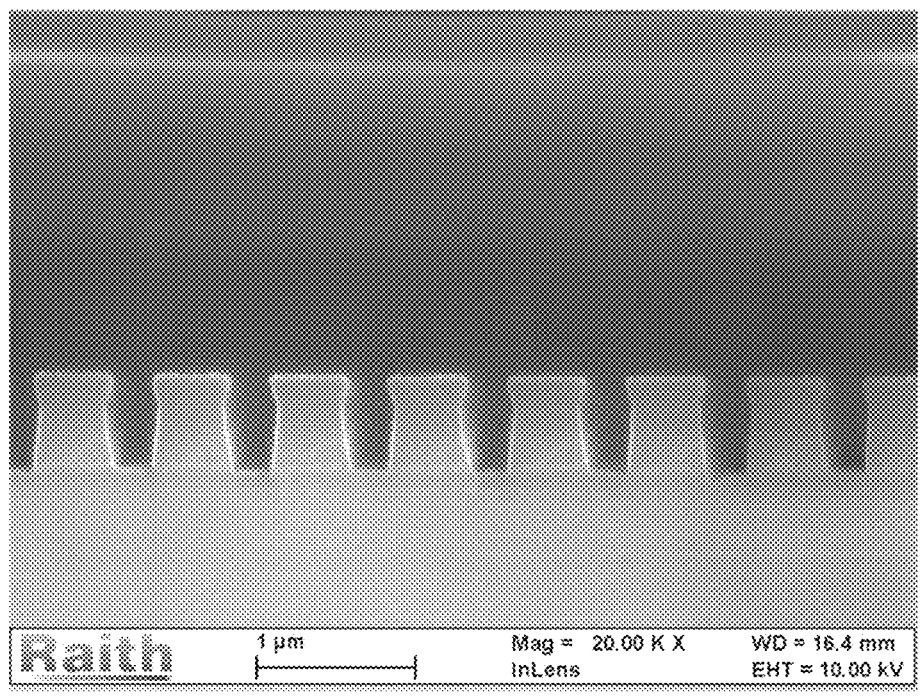
FIG. 4 includes (a), (b) SEM images showing a fabrication example of the light modulator of the configuration illustrated in FIG. 1, and shows a structure of the light modulator in a cross section illustrated in (a) in FIG. 2.
Figure 4:
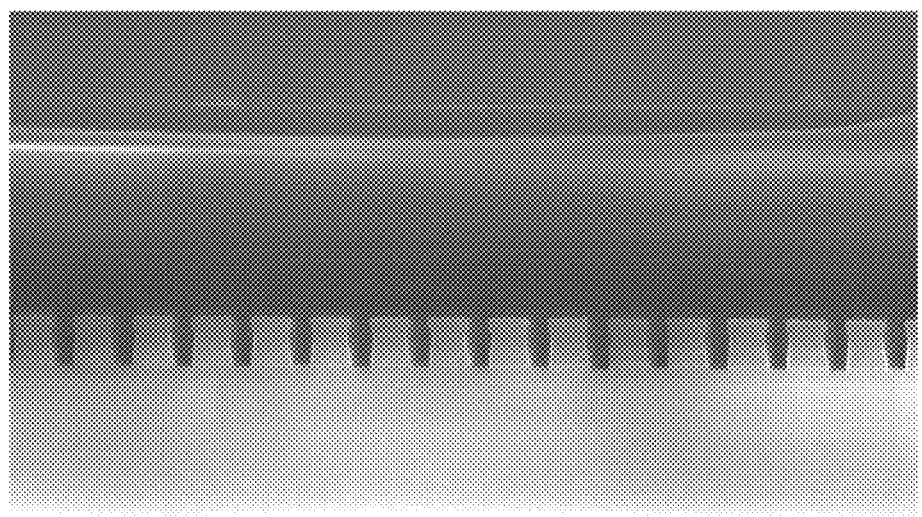
Figure 4:
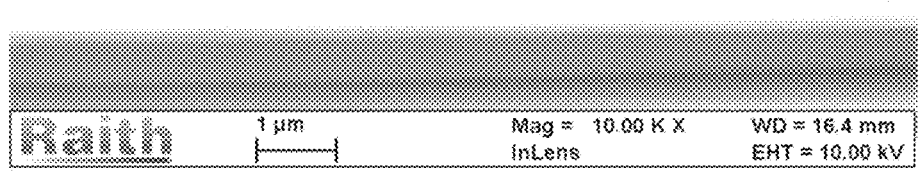

(a) and (b) in FIG. 4 are SEM images showing a fabrication example of the light modulator 1A of the configuration illustrated in FIG. 1, and show the structure of the light modulator in the xz cross section illustrated in (a) in FIG. 2. The light modulator of this fabrication example is fabricated by setting the pattern width in the design as s=440 nm, the height as tg=570 nm, and the arrangement period as Λ=780 nm. Further, (a) and (b) in FIG. 4 show the structure of the same light modulator at different magnifications. As shown in FIG. 4, the EO polymer of the modulation layer 30 is sufficiently filled between the pattern portions of the conductive pattern layer 20.

The operation and function of the light modulator 1A having the above configuration will be described. In the light modulator 1A, the modulation layer 30 is formed of the EO polymer having an internal polarization structure. The internal polarization structure of the EO polymer is obtained by, for example, dispersing EO dye molecules in the polymer, and by applying a high electric field to the EO polymer under a high temperature, the internal polarization structure of the EO dye molecules and the like can be oriented along the electric field (poling treatment).

Specifically, for example, after forming the modulation layer 30 on the base layer 10 and the conductive pattern layer 20 as described above, an electric field is applied using the pattern portions 21 and 26 of the conductive pattern layer 20 while heating the EO polymer of the modulation layer 30 to a glass transition temperature or higher, thereby orienting molecules having the internal polarization structure such as the EO dye molecules in the EO polymer along the electric field. Thereafter, the orientation state of the internal polarization structure is fixed by returning the EO polymer to a normal temperature. That is, by performing the above process, the EO dye molecules are fixed in a strongly polarized or oriented state in the EO polymer.

In the configuration example illustrated in FIG. 1, the first and second pattern portions 21 and 26 are alternately arranged in the x-axis direction in the conductive pattern layer 20. In the above configuration, in the filling portion 31 of the modulation layer 30, the EO polymer is alternately polarized or oriented in the ±x-axis direction. In this state, as indicated by arrows E in FIG. 3, the electric field is applied to the EO polymer of the modulation layer 30 along the direction of the polarization or the orientation of the internal polarization structure using the conductive pattern layer 20, so that the refractive index of the EO polymer can be changed according to a strength of the applied electric field (applied voltage) by the electro-optic effect.

In the light modulator 1A of the present embodiment, the phase modulation of the object light L1 being incident from the lower surface 10b of the base layer 10 is realized by controlling the refractive index change in the modulation layer 30 described above. The phase of the object light L1 is modulated by being transmitted through the modulation layer 30 in which the refractive index is controlled by the electric field application using the conductive pattern layer 20, and the object light L1 is reflected by the reflection layer 40 formed on the modulation layer 30 to be output as the modulated light L2 from the lower surface 10b of the base layer 10.

Effects of the light modulator 1A and the light modulation apparatus 2A according to the above embodiment will be described.

In the light modulator 1A illustrated in FIG. 1 and FIG. 2, the conductive pattern layer 20 including the pattern portions 21 and 26 and the modulation layer 30 formed of the EO polymer are formed on the upper surface 10a of the insulating base layer 10 having the light transmitting property. Further, the EO polymer layer of the modulation layer 30 includes the filling portion 31 and the spacer portion 32, and the filling portion 31 fills between the pattern portions 21 and 26, and the spacer portion 32 is formed on the conductive pattern layer 20 with the predetermined thickness.

In the above configuration of the light modulator 1A, the electric field is applied to the EO polymer of the modulation layer 30 using the pattern portions 21 and 26 of the conductive pattern layer 20 to change the refractive index of the modulation layer 30, thereby modulating the phase of the object light L1. According to the above configuration, by using the EO polymer which responds faster than the liquid crystal in the modulation layer 30, the phase modulation of the modulation object light L1 can be performed at high speed, for example, at the operation speed of 1 MHz or more.

Further, in the above configuration, the lower surface 10b of the base layer 10 is utilized as the incident surface for the object light L1, and in addition, the reflection layer 40 is formed on the upper surface 30a of the modulation layer 30 for the conductive pattern layer 20 and the modulation layer 30 on the base layer 10, and the object light L1 having the phase being modulated by the modulation layer 30 is reflected by the reflection layer 40 and output from the lower surface 10b of the base layer 10 as the modulated light L2. In the above configuration, by appropriately setting the configuration conditions such as the thickness of the EO polymer of the modulation layer 30, the modulation layer 30 can also function as the optical resonator for the object light L1. Thus, it is possible to suitably realize the light modulator 1A of the phase modulation type with high speed response using the EO polymer layer.

The optical resonator in the modulation layer 30 of the light modulator 1A has a structure in which two resonators of a resonator in the x-axis direction (horizontal direction) and a resonator in the z-axis direction (vertical direction) are combined. In these resonators, the resonator in the x-axis direction is formed in the filling portion 31 sandwiched between the adjacent pattern portions 21 and 26 of the conductive pattern layer 20. Further, the resonator in the z-axis direction is formed as an unbalanced Fabry-Perot resonator in the spacer portion 32 sandwiched between the reflection layer 40 on the upper surface 30a of the modulation layer 30 and the upper surface 20a of the conductive pattern layer 20.

In the above light modulator 1A, in consideration of the above structure of the optical resonator, when the wavelength of the object light L1 is set to $\lambda$ and the refractive index of the EO polymer is set to n, the thickness d of the spacer portion 32 of the modulation layer 30 provided between the upper surface 20a of the conductive pattern layer 20 and the upper surface 30a of the modulation layer 30 is preferably set to an even multiple of $\lambda/4n$ (integer multiple of $\lambda/2n$). In this case, the modulation layer 30 can suitably function as the optical resonator for the object light L1.

As to the configuration of the conductive pattern layer 20 used for applying the electric field to the modulation layer 30, in the above light modulator 1A, specifically, the first and second pattern portions 21 and 26 with the longitudinal direction being the y-axis direction are used, and the first pattern portions 21 to which the first voltage is applied via the first electrode 24 and the second pattern portions 26 to which the second voltage is applied via the second electrode 29 are arranged alternately in the x-axis direction. According to the above configuration, the periodic arrangement structure by the conductive pattern layer 20 and the modulation layer 30 on the base layer 10 can be suitably realized.

Further, in the above light modulator 1A, in consideration of the property of the EO polymer and the like, the wavelength $\lambda$ of the modulation object light L1 is preferably set to 1 μm or more. By setting the wavelength $\lambda$ as described above, it is possible to suitably realize the phase modulation of the object light L1 in the modulation layer 30 using the EO polymer. Further, as to the upper limit of the wavelength $\lambda$ of the object light L1, the wavelength $\lambda$ is preferably set to 15 μm or less.

The effects of the light modulator 1A of the above configuration will be further described. In the light modulator 1A illustrated in FIG. 1 and FIG. 2, for example, the conductive pattern layer 20 made of Si and the modulation layer 30 made of the EO polymer are formed on the base layer 10 made of $SiO_2$. As described above, the configuration including the $SiO_2$ base layer and the Si conductive pattern layer may be fabricated using, for example, a silicon on quartz (SOQ) substrate in which a silicon thin film is formed on a quartz substrate in order to make the Si layer having the subwavelength structure with the thickness of, for example, about several 100 nm self-standing.

In addition, the $SiO_2$ layer in the SOQ substrate has a thickness of, for example, 625 μm. When the above SOQ substrate is used to form a light modulator of a reflection type by forming a reflection layer on a lower surface of the $SiO_2$ layer as in a configuration illustrated in FIG. 5 of Patent Document 1, for example, the $SiO_2$ layer having the thickness of about 625 μm functions as an optical resonator.

Figure 5:
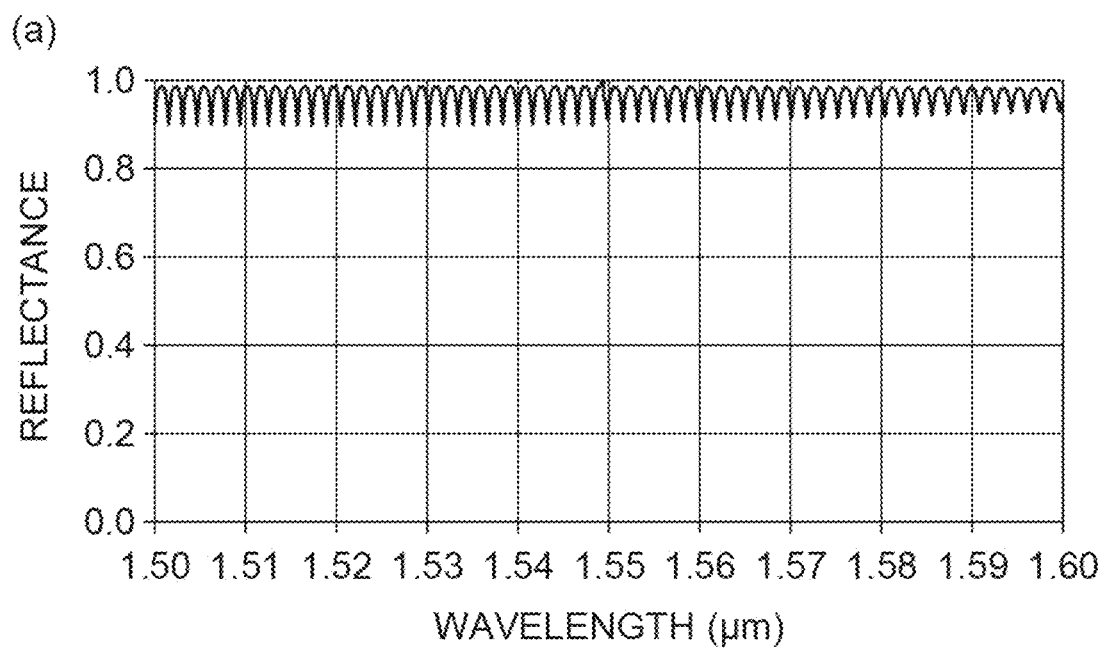
FIG. 5 includes graphs showing wavelength dependency of a light reflectance in a configuration described in Patent Document 1, and shows (a) a reflectance property when a thickness of a $SiO_2$ layer is set to 500 μm, and (b) a reflectance property when the thickness of the $SiO_2$ layer is set to 2 μm.
Figure 5:
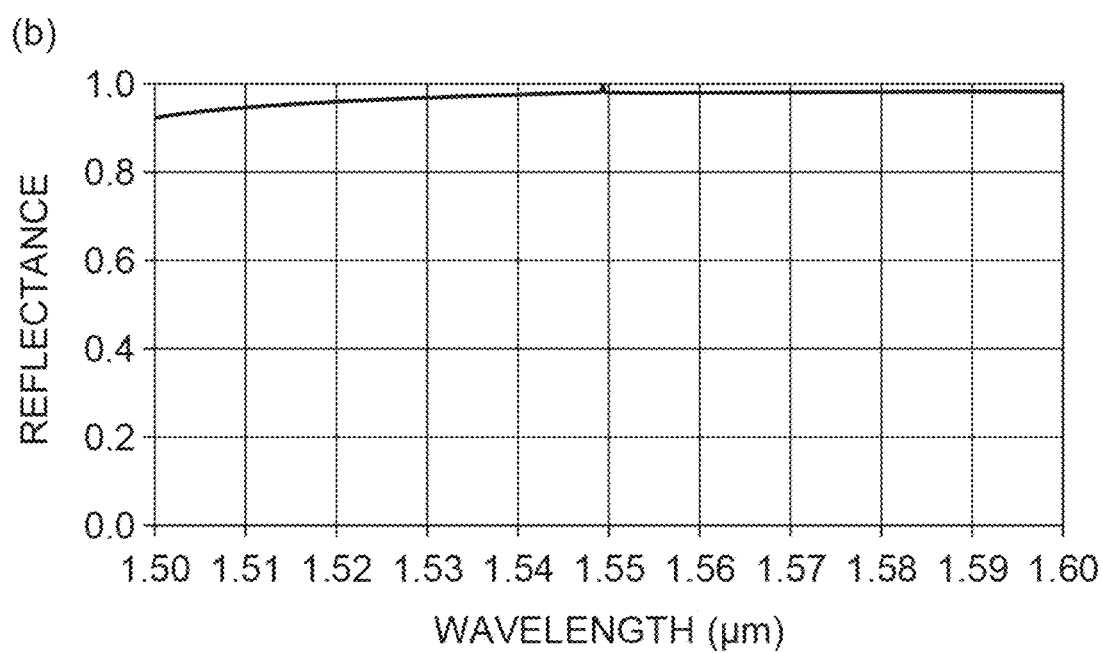

FIG. 5 includes graphs showing wavelength dependency of a light reflectance in the configuration described in Patent Document 1, and (a) in FIG. 5 shows a reflectance property when the thickness of the $SiO_2$ layer is set to 500 μm, and (b) in FIG. 5 shows a reflectance property when the thickness of the $SiO_2$ layer is set to 2 μm. In the graphs of (a) and (b) in FIG. 5, the horizontal axis indicates the wavelength (μm) of the modulation object light, and the vertical axis indicates the reflectance.

As shown in (a) in FIG. 5, when the thickness of the $SiO_2$ layer is set to 500 μm being thick, Fabry-Perot resonance caused by the above occurs at multiple wavelengths. In this case, a light component having a wavelength different from a desired wavelength is mixed in the phase modulation of the object light. On the other hand, as shown in (b) in FIG. 5, when the thickness of the $SiO_2$ layer is reduced to, for example, 2 μm, Fabry-Perot resonance at multiple wavelengths as described above does not occur. However, in the SOQ substrate, a process of processing the $SiO_2$ layer so as to be uniformly thin has a high degree of difficulty, it takes a long time for a polishing process, and it is difficult to make the light modulator self-standing by thinning the $SiO_2$ layer.

On the other hand, in the light modulator 1A according to the above embodiment, as described above, the object light L1 is incident from the lower surface 10b of the base layer 10, and the reflection layer 40 is formed on the upper surface 30a of the modulation layer 30 made of the EO polymer, so that the modulation layer 30 functions as the optical resonator. Thus, the fabrication process of the light modulator 1A is simplified, and the light modulator of the phase modulation type having the reflection type configuration can be suitably realized.

An example of a method of manufacturing the light modulator 1A according to the above embodiment will be briefly described. First, a SOQ substrate including a $SiO_2$ layer serving as the base layer 10 and a Si layer serving as the conductive pattern layer 20 is prepared, and the SOQ substrate is cleaned by using general organic cleaning. In this case, for example, ultrasonic cleaning of the SOQ substrate is performed in acetone, IPA, or ethanol. Next, a Cr layer having a thickness of about 100 nm is formed on the Si layer of the SOQ substrate using a sputtering apparatus.

Subsequently, an EB resist (for example, ZEP520A-7) is applied on the Cr layer, and a thickness of about 200 nm is obtained by spin coating. Thereafter, an EB lithography apparatus is used to perform lithography and development, thereby forming a resist pattern having a subwavelength structure. Next, dry etching of the Cr layer is performed using the resist pattern as a protective film to form a Cr mask pattern. Further, the Si layer is dry-etched, the remaining resist is removed by $O_2$ ashing, and Cr is removed by wet etching, thereby forming the subwavelength structure of the Si layer serving as the conductive pattern layer 20. As a gas for dry etching, for example, Ar, $O_2$, and $Cl_2$ can be used for etching of Cr. Ar and $CF_4$ can be used for etching of the Si layer. Subsequently, a pattern is formed by photolithography, Cr/Au is vapor-deposited using an EB vapor-deposition apparatus, and then a lift-off process is performed to form a Cr/Au electrode on the Si layer. In addition, a thickness of the Cr/Au electrode can be set to, for example, Cr (10 nm)/Au (200 nm).

Next, an EO polymer layer serving as the modulation layer 30 is formed on the $SiO_2$ layer and the Si subwavelength structure. At this time, for example, a 20 wt % EO polymer solution is used, and spin coating is performed on the Si subwavelength structure. In this case, when a rotation frequency in spin coating is set to 2000 rpm, a thickness of the EO polymer layer is about 2 µm. Subsequently, baking is performed in order to remove a solvent from the EO polymer layer. The baking is performed, for example, in two separate steps. In this case, the first baking is performed in a clean room at 120° C. for 60 minutes, and the second baking is performed in a vacuum chamber at 100° C. for 60 minutes.

Subsequently, a mask is formed with a photoresist on the EO polymer layer on the Cr electrode, and an Au thin film serving as the reflection layer 40 is formed on the EO polymer layer with a thickness of about 100 nm by using a sputtering apparatus. The mask portion and the underlying EO polymer layer are removed by an organic solvent, $O_2$ ashing, or the like.

Next, a poling treatment of the EO polymer layer is performed. The element is gradually heated to about 123° C. being a glass transition temperature of the EO polymer, and in this state, a predetermined electric field (for example, 100 V/µm) is applied between the electrodes for, for example, 30 minutes. Thereafter, by rapidly cooling the element to a room temperature, the orientation of the EO dye molecules in the EO polymer is fixed, whereby the EO polymer layer exhibits the Pockels effect.

Subsequently, the element is placed on a mount having an opening, and the element and the mount are electrically coupled by wire bonding. Thus, the light modulator having the configuration illustrated in FIG. 1 and FIG. 2 can be obtained.

Properties of the light modulator 1A according to the above embodiment will be described together with specific configuration examples, measurement data, and calculation data. In the following measurement examples and calculation examples, the base layer 10 is set to the $SiO_2$ layer, the conductive pattern layer 20 is set to the Si layer, and the reflection layer 40 is set to the Au layer.

Figure 6:
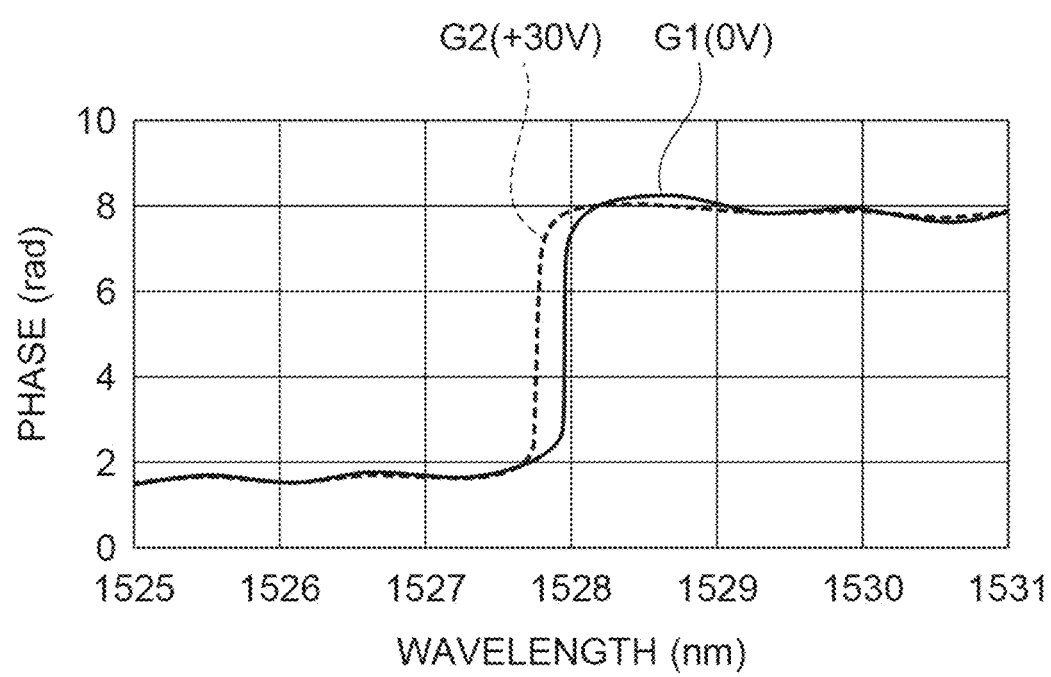
FIG. 6 is a graph showing a measurement example of wavelength dependency of a phase in phase modulation of light by the light modulator illustrated in FIG. 1.

FIG. 6 is a graph showing a measurement example of wavelength dependency of the phase in the phase modulation of light by the light modulator 1A illustrated in FIG. 1. In this measurement example, measurement data for the light modulator in which the width of the pattern portion in the conductive pattern layer 20 is set to s=420 nm, the height is set to tg=570 nm, the arrangement period is set to Λ=780 nm, and the total thickness of the EO polymer of the modulation layer 30 is set to tp=2006 nm, is shown. In the graph of FIG. 6, the horizontal axis indicates the wavelength (nm) of the modulation object light, and the vertical axis indicates the phase (rad) in the phase modulation of the object light.

Further, in FIG. 6, a graph G1 shows a phase property when the applied voltage is set to 0 V, and a graph G2 shows a phase property when the applied voltage is set to +30 V. In this measurement example, by applying the external voltage of +30 V to the light modulator 1A, dynamic phase modulation of 5.26 rad (301 degrees) is realized at a wavelength of λ=1527.8 nm.

Figure 7:
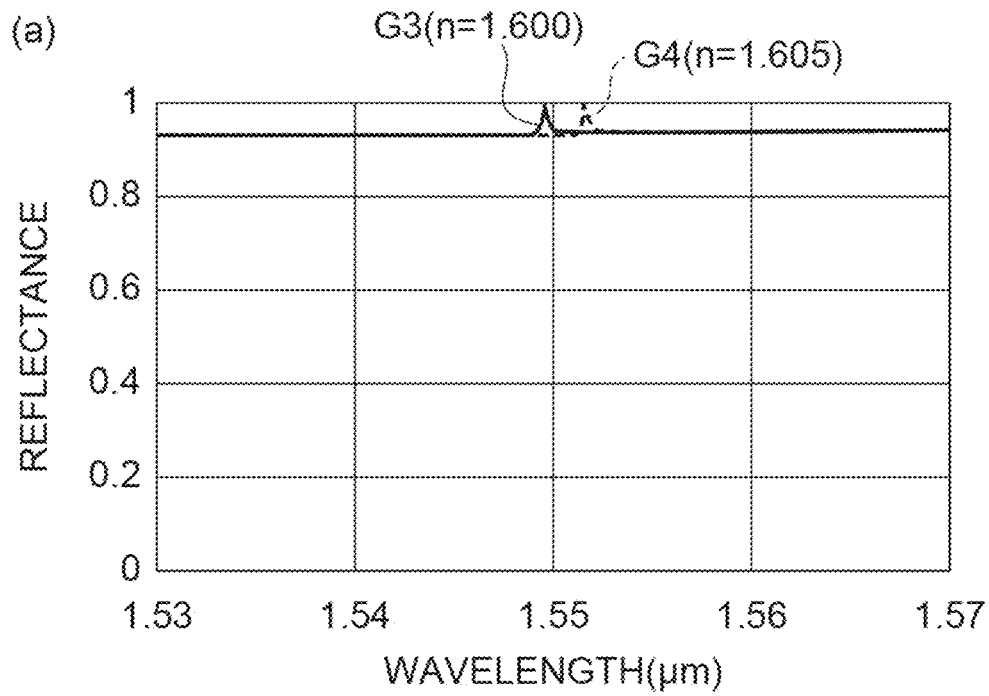
FIG. 7 includes (a), (b) graphs showing wavelength dependency of a light reflectance in the light modulator illustrated in FIG. 1.
Figure 7:
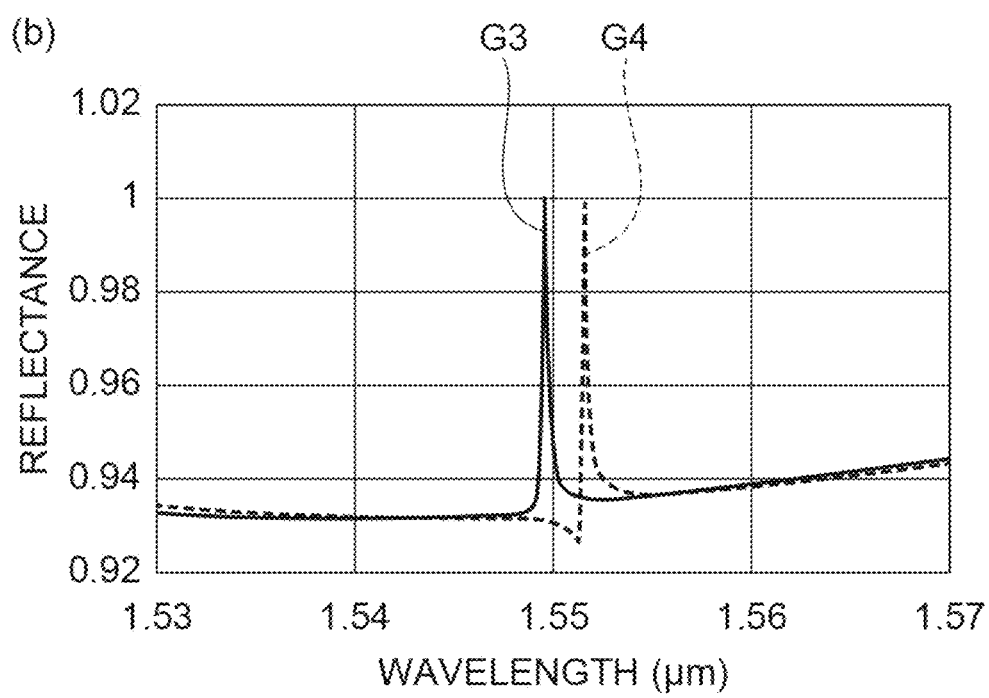
Figure 8:
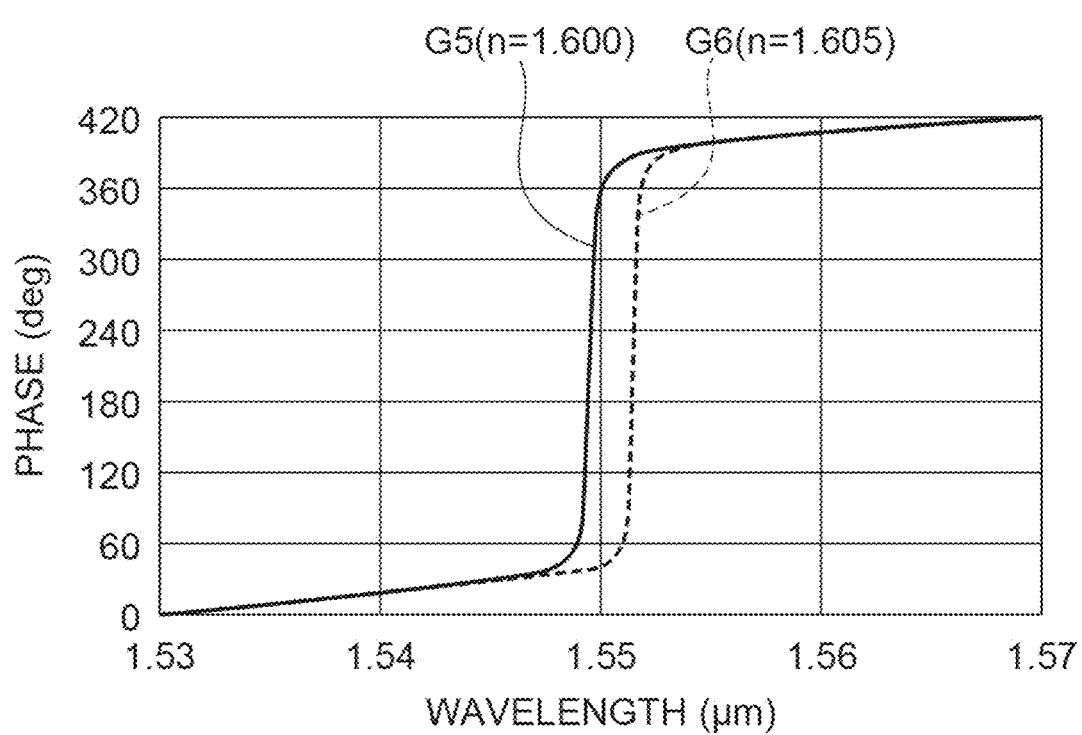
FIG. 8 is a graph showing wavelength dependency of the phase in the phase modulation of light by the light modulator illustrated in FIG. 1.
Figure 9:
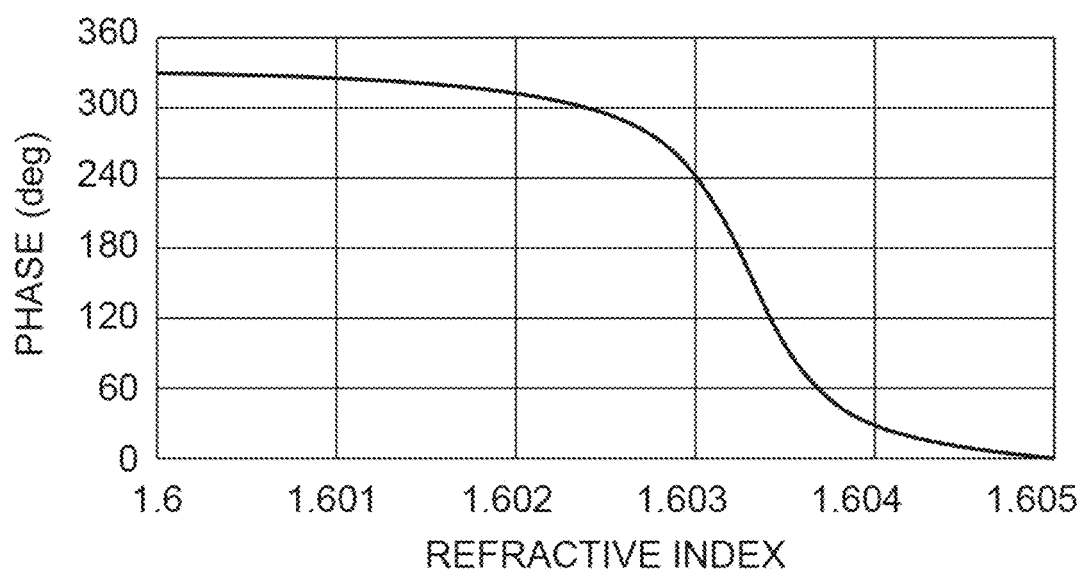
FIG. 9 is a graph showing refractive index dependency of the phase in the phase modulation of light by the light modulator illustrated in FIG. 1.

FIG. 7 to FIG. 9 show a calculation example of properties of the light modulator 1A in the configuration in which the cross-sectional shape of each pattern portion in the conductive pattern layer 20 is a rectangular shape as illustrated in FIG. 3. In this calculation example, calculation data for the configuration in which the wavelength of the object light L1 is set to λ=1550.8 nm, the polarization direction is set to TE, the width of the pattern portion in the conductive pattern layer 20 is set to s=378 nm, the height is set to tg=553 nm, the arrangement period is set to Λ=756 nm, the angle of the pattern portion is set to θg=90 degrees, the total thickness of the EO polymer of the modulation layer 30 is set to tp=2006 nm, and the thickness of the reflection layer 40 is set to tr=100 nm, is shown. In this case, a duty ratio of the grating pattern in the conductive pattern layer 20 is 0.5.

(a) and (b) in FIG. 7 are graphs showing wavelength dependency of the light reflectance in the light modulator, and the graph of (b) in FIG. 7 is a partially enlarged view of the graph of (a) in FIG. 7. In the graphs of FIG. 7, the horizontal axis indicates the wavelength (µm) of the modulation object light, and the vertical axis indicates the light reflectance. Further, in (a) and (b) in FIG. 7, a graph G3 shows a reflectance property when the refractive index of the EO polymer of the modulation layer 30 is set to n=1.600, and a graph G4 shows a reflectance property when the refractive index of the EO polymer is set to n=1.605. In the reflectance property shown in FIG. 7, a high reflectance of 90% or more is obtained in a desired wavelength band including a wavelength of λ=1550.8 nm.

FIG. 8 is a graph showing wavelength dependency of the phase in the phase modulation of light by the light modulator. In the graph of FIG. 8, the horizontal axis indicates the wavelength (µm) of the modulation object light, and the vertical axis indicates the phase (deg). Further, in FIG. 8, a graph G5 shows a phase property when the refractive index of the EO polymer of the modulation layer 30 is set to n=1.600, and a graph G6 shows a phase property when the refractive index of the EO polymer is set to n=1.605. The phase property shown in FIG. 8 corresponds to the phase property shown in FIG. 6 with respect to the measurement data.

FIG. 9 is a graph showing refractive index dependency (applied voltage dependency) of the phase in the phase modulation of light by the light modulator. In the graph of FIG. 9, the horizontal axis indicates the refractive index of the EO polymer of the modulation layer 30, and the vertical axis indicates the phase (deg). Further, in the graph of FIG. 9, the wavelength of the object light is set to λ=1550.8 nm. As shown in this graph, the refractive index of the EO polymer of the modulation layer 30 is controlled by changing the applied voltage applied to the conductive pattern layer 20, thereby arbitrarily modulating the phase of the object light.

In addition, the change of the refractive index of the EO polymer when the electric field (voltage) is applied to the modulation layer 30 using the conductive pattern layer 20 will be described. The change in the refractive index of the electro-optic material due to the Pockels effect can be estimated by the following Formula (1).

[Formula 1]

$$\Delta n = -\frac{1}{2} n^3 r_{33} \frac{V_m}{W_g} \quad (1)$$

Here, n is the refractive index of the EO polymer, n=1.600 in the above configuration example, and $r_{33}$ is the electro-optic constant of the EO polymer, $r_{33}$=100 pm/V in the assumed EO polymer material. Further, Vm is the external applied voltage, and Wg is the pattern interval in the grating pattern of the conductive pattern layer 20.

As an application example of the light modulator 1A of the above configuration, specifically, assuming a configuration which operates in the case of the TE wave in which the direction of the grating in the conductive pattern layer 20 and the direction of the electric field of the incident modulation object light L1 are directed in the same direction, the electro-optic constant of the EO polymer is obtained as follows.

[Formula 2]

$$r_{13} = \frac{1}{3} r_{33} \quad (2)$$

When these values are substituted into the above Formula (1), the refractive index change Δn when the voltage 30 V is applied becomes as in the following Formula (3).

[Formula 3]

$$\Delta n = -\frac{1}{2} \times 1.6^3 \times \frac{100}{3} [pm] \times \frac{30 \ [V]}{0.3 \ [\mu m]} = -0.00676 \quad (3)$$

In addition, in the above calculation example, the calculation is performed at Δn=0.005 with a slight margin. Further, in the actual light modulator, the voltage can be applied up to, for example, about ±40 V.

Figure 10:
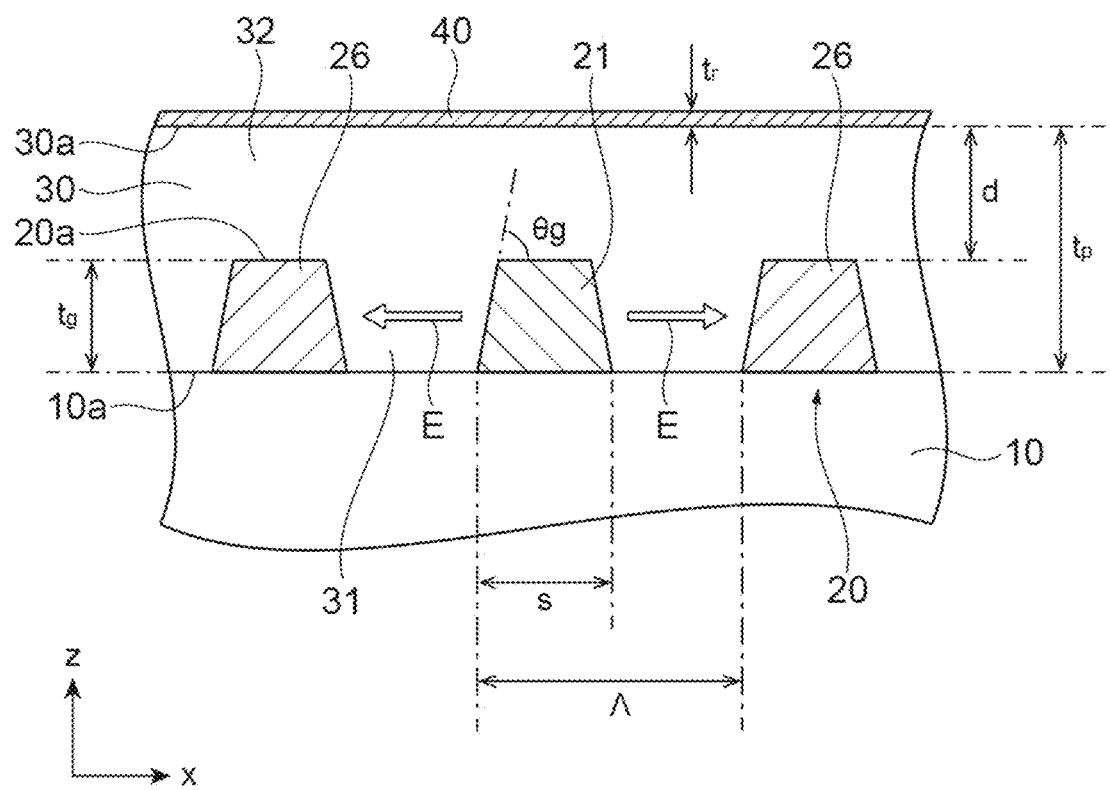
FIG. 10 is a diagram illustrating a modification of the configuration of the light modulator illustrated in FIG. 3.

In the above calculation example, the cross-sectional shape of each pattern portion in the conductive pattern layer 20 is assumed to be the rectangular shape, however, in the actually fabricated light modulator, the cross-sectional shape of the pattern portion may be, for example, a trapezoidal shape. FIG. 10 is a diagram illustrating a modification of the configuration of the light modulator illustrated in FIG. 3. This configuration example is similar to FIG. 3 in that the width of the pattern portion in the grating pattern of the conductive pattern layer 20 is set to s, the height is set to tg, and the arrangement period is set to Λ, but the cross-sectional shape of the pattern portion is not a rectangular shape, but a trapezoidal shape with an inclination angle θg.

Figure 11:
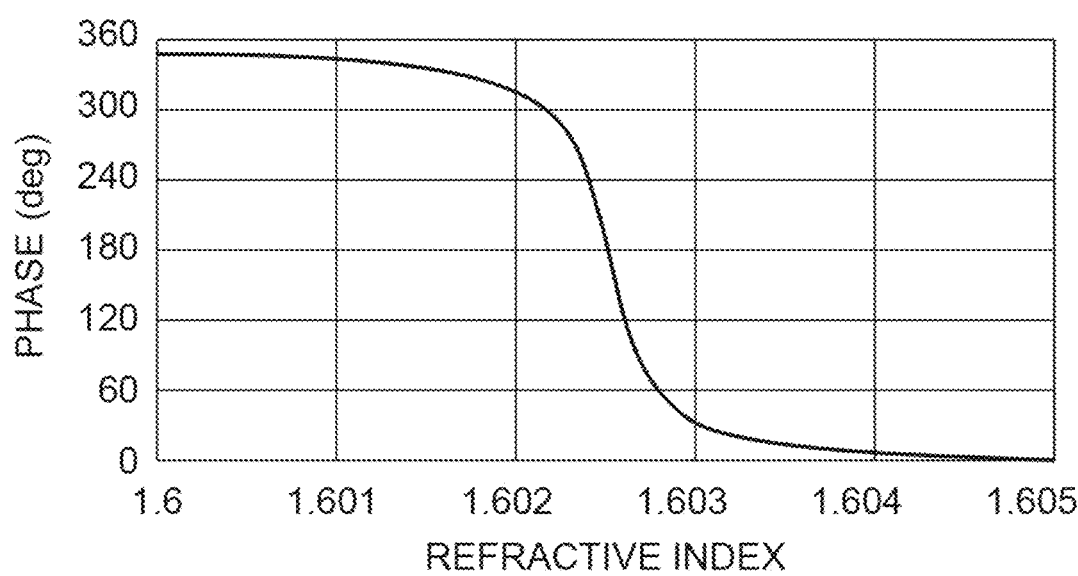
FIG. 11 is a graph showing refractive index dependency of the phase in the phase modulation of light by the light modulator illustrated in FIG. 10.

FIG. 11 is a graph showing refractive index dependency of the phase in the phase modulation of light by the light modulator having the configuration illustrated in FIG. 10. In this calculation example, calculation data for the configuration in which the wavelength of the object light L1 is set to λ=1630.5 nm, the polarization direction is set to TE, the width of the pattern portion in the conductive pattern layer 20 is set to s=440 nm, the height is set to tg=570 nm, the arrangement period is set to Λ=780 nm, the angle of the pattern portion is set to θg=87.5 degrees, the total thickness of the EO polymer of the modulation layer 30 is set to tp=2 μm, and the thickness of the reflection layer 40 is set to tr=100 nm, is shown. In this case, the duty ratio of the grating pattern in the conductive pattern layer 20 is 0.564.

In the light modulator 1A of the above configuration, when the cross-sectional shape of each pattern portion in the conductive pattern layer 20, for example, the inclination angle θg in the trapezoidal shape of the cross section changes, the reflection property, the phase modulation property, and the like of the light modulator change. (a) and (b) in FIG. 12 are graphs showing wavelength dependency of the light reflectance in the light modulator of the configuration illustrated in FIG. 10.

Figure 12:
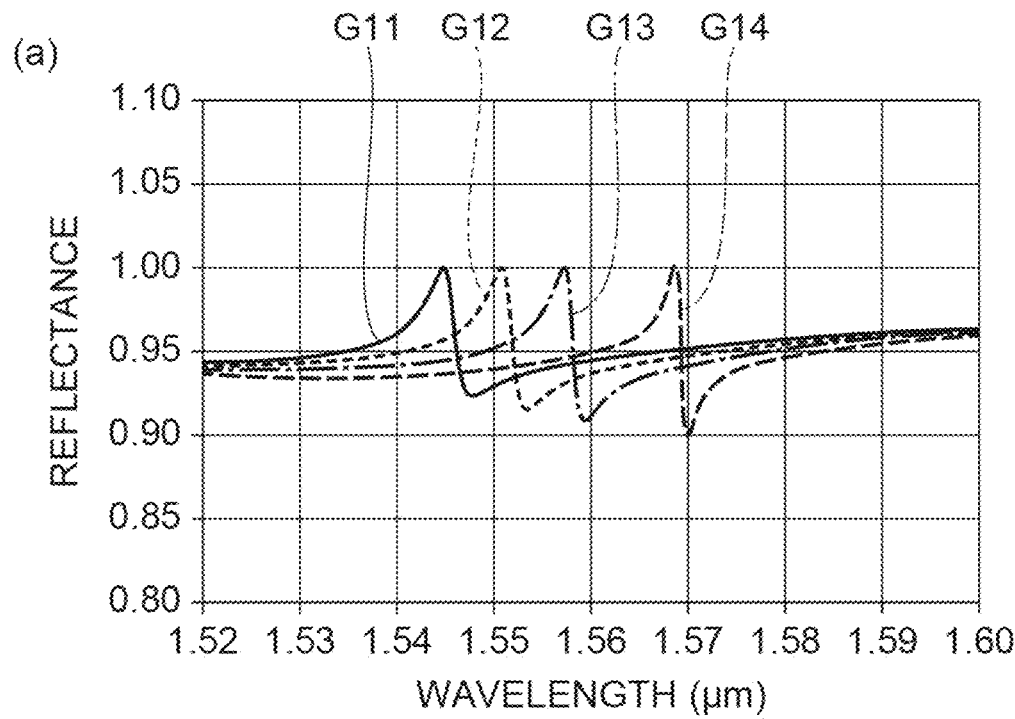
FIG. 12 includes (a), (b) graphs showing wavelength dependency of the light reflectance in the light modulator illustrated in FIG. 10.
Figure 12:
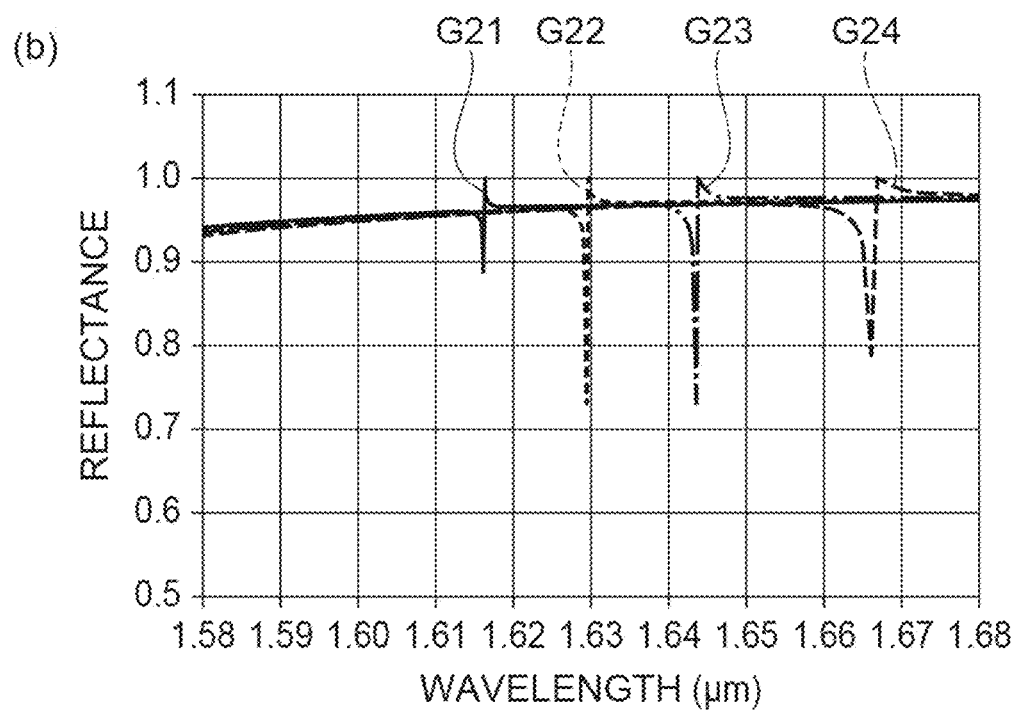

(a) in FIG. 12 shows the reflectance property of the light modulator when the width of the pattern portion is set to s=360 nm, the height is set to tg=570 nm, the arrangement period is set to Λ=780 nm, and the duty ratio is set to 0.461. Further, (b) in FIG. 12 shows the reflectance property of the light modulator when the width of the pattern portion is set to s=440 nm, the height is set to tg=570 nm, the arrangement period is set to Λ=780 nm, and the duty ratio is set to 0.564.

In the graphs of FIG. 12, the horizontal axis indicates the wavelength (μm) of the modulation object light, and the vertical axis indicates the light reflectance. Further, in (a) and (b) in FIG. 12, graphs G11 and G21 show the reflectance properties when the angle of the trapezoidal shape of the pattern portion is set to θg=83 degrees, graphs G12 and G22 show the reflectance properties when it is set to θg=85 degrees, graphs G13 and G23 show the reflectance properties when it is set to θg=87 degrees, and graphs G14 and G24 show the reflectance properties when it is set to θg=90 degrees and the cross-sectional shape is set to the rectangular shape.

In the graphs shown in (a) and (b) in FIG. 12, when the inclination angle θg of the pattern portion in the conductive pattern layer 20 changes from the vertical angle (90 degrees), the wavelength of the resonance position tends to shift to the short wavelength side. Further, in the actual element, the element properties such as the wavelength of the resonance position change also by other parameters such as the arrangement period Λ of the pattern portions. Therefore, in the design and fabrication of the light modulator and the evaluation of the properties thereof, it is necessary to appropriately consider the influence of these structural parameters on the properties.

A function of the modulation layer 30 as the optical resonator in the light modulator 1A according to the above embodiment and confinement of light in the modulation layer 30 will be described. In the light modulator 1A of the above configuration, the modulation object light is confined in the microstructure and the optical resonator structure on the base layer 10 by the conductive pattern layer 20 and the modulation layer 30, so that the phase modulation of the object light by the EO polymer of the modulation layer 30 can be suitably realized. In addition, in the following calculation example, the cross-sectional shape of the pattern portion is set to the rectangular shape having the inclination angle of θg=90 degrees.

Figure 13:
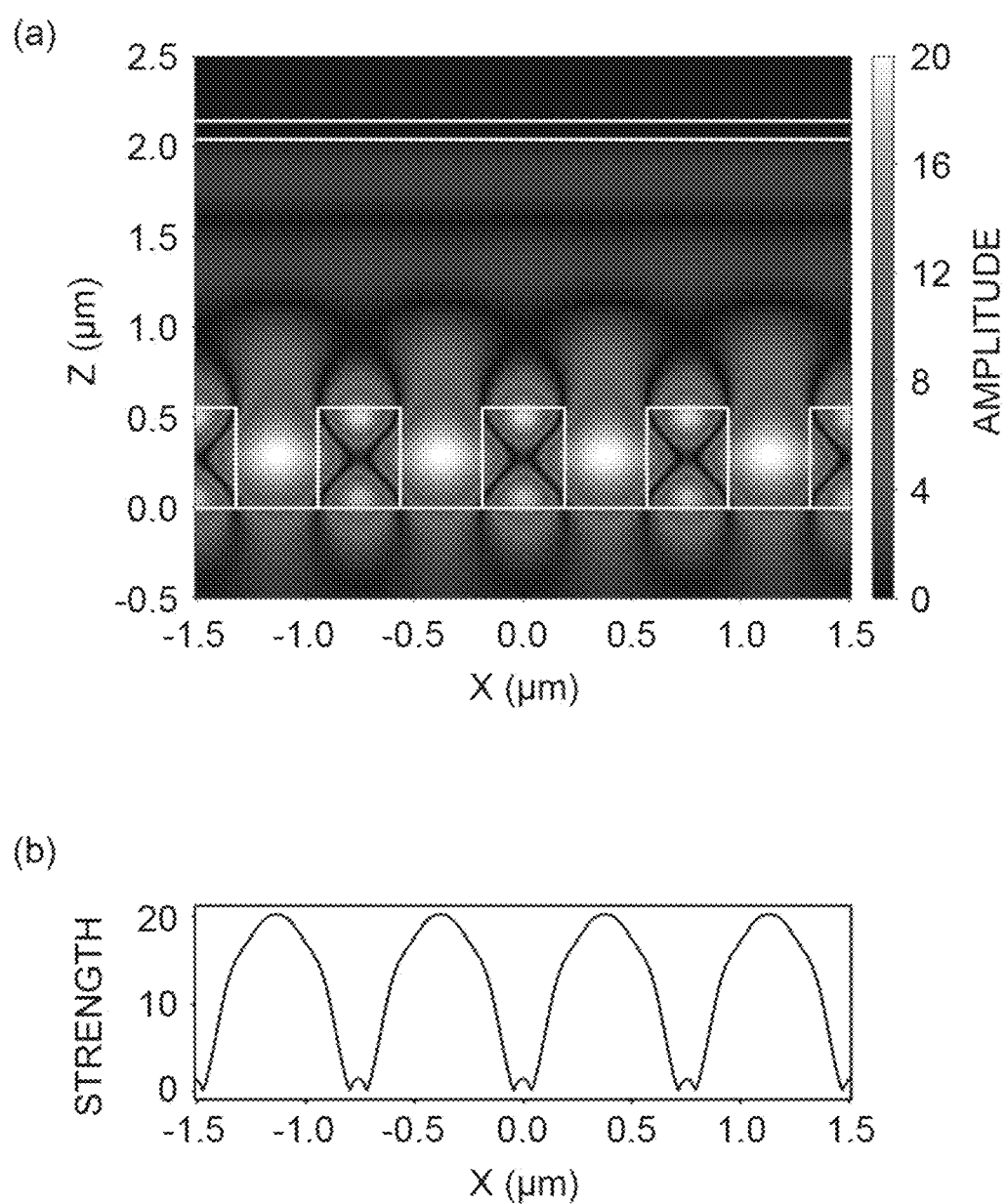
FIG. 13 includes (a), (b) diagrams showing an electric field strength distribution of modulation object light in the light modulator.

FIG. 13 includes diagrams showing an electric field strength distribution of the modulation object light in the inside of the light modulator 1A. In this calculation example, calculation data for the configuration in which the wavelength of the object light L1 is set to λ=1.55 μm, the polarization direction is set to TE, the width of the pattern portion in the conductive pattern layer 20 is set to s=378 nm, the height is set to tg=553 nm, the arrangement period is set to Λ=756 nm, the total thickness of the EO polymer of the modulation layer 30 is set to tp=2006 nm, and the thickness of the reflection layer 40 is set to tr=100 nm, is shown.

(a) in FIG. 13 shows the electric field strength distribution in the xz cross section (see (a) in FIG. 2). In the distribution diagram of (a) in FIG. 13, the horizontal axis indicates x (μm), the vertical axis indicates z (μm), and white lines in the diagram indicate boundaries of the respective layers of the base layer 10, the conductive pattern layer 20, the modulation layer 30, and the reflection layer 40. Further, (b) in FIG.

13 is a graph showing the electric field strength distribution along a line passing through the center of each pattern portion of the conductive pattern layer 20 in the distribution diagram of (a) in FIG. 13. In the graph of (b) in FIG. 13, the horizontal axis indicates x (μm), and the vertical axis indicates the electric field strength. Further, as to incidence of the object light on the light modulator, the calculation is performed on the assumption that the object light is incident from the position of z=−0.5 μm of the SiO₂ base layer 10.

As shown in the distribution diagram and the graph of (a) and (b) in FIG. 13, in the light modulator 1A of the above configuration, the object light L1 is confined in the filling portion 31 of the modulation layer 30 provided between the first and second pattern portions 21 and 26 of the conductive pattern layer 20. Thus, the phase of the object light L1 can be modulated with high efficiency in the modulation layer 30 made of the EO polymer.

Figure 14:
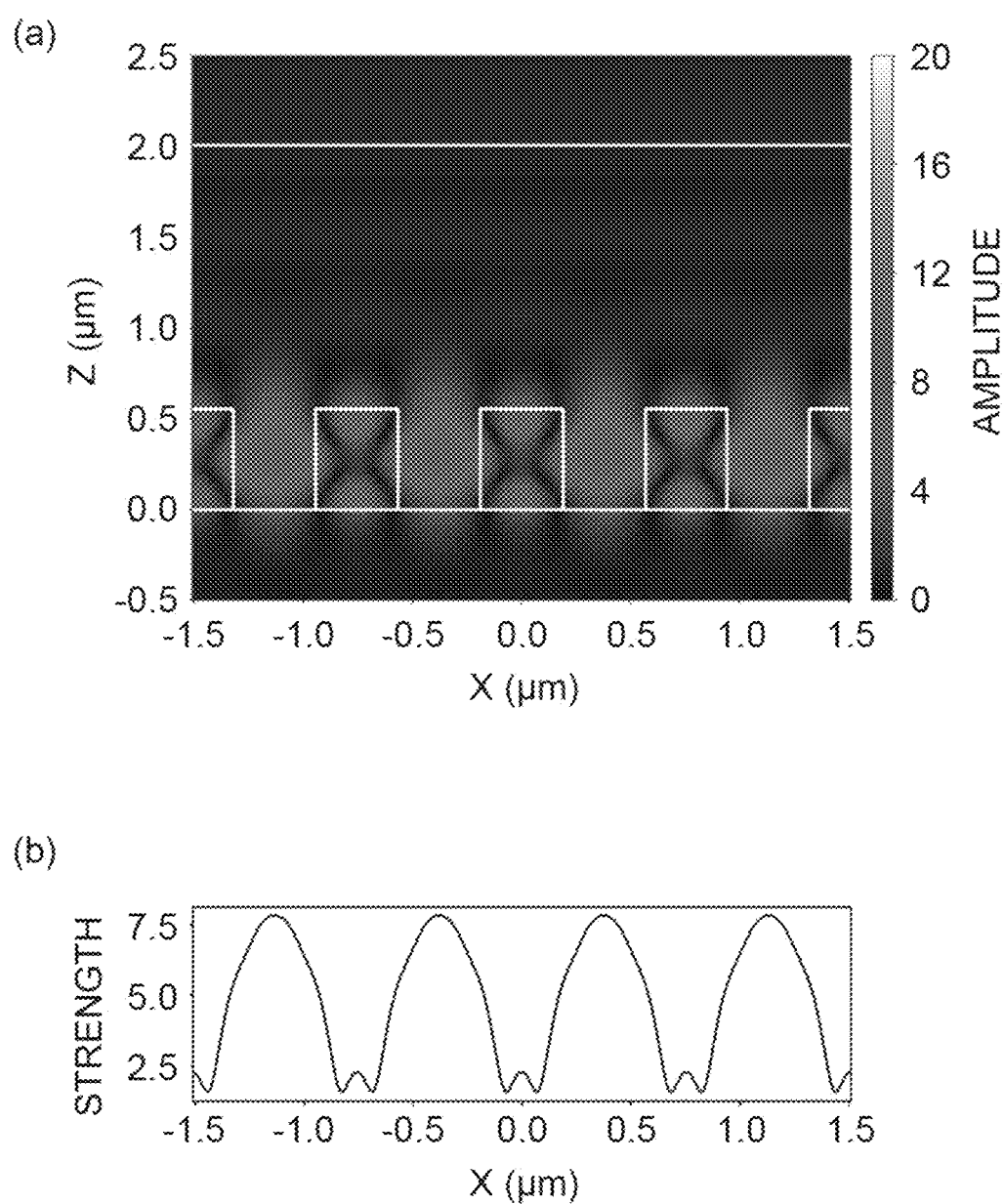
FIG. 14 includes (a), (b) diagrams showing the electric field strength distribution of the modulation object light in the light modulator.

FIG. 14 includes diagrams showing the electric field strength distribution of the modulation object light in the inside of the light modulator, and similar to FIG. 13, (a) in FIG. 14 shows the electric field strength distribution in the xz cross section, and (b) in FIG. 14 shows a graph of the electric field strength distribution along the line passing through the center of each pattern portion of the conductive pattern layer 20. Further, in this calculation example, calculation data for the configuration in which the reflection layer 40 is not provided on the modulation layer 30 is shown. Comparing FIG. 13 and FIG. 14, the reflection layer 40 formed on the modulation layer 30 greatly improves the function of the optical resonator in the modulation layer 30 and the light confinement effect.

In the light modulator 1A of the above configuration, in consideration of the confinement effect of light shown in FIG. 13, it is preferable to set the thickness d (see FIG. 3) of the spacer portion 32 of the modulation layer 30 provided between the upper surface 20a of the conductive pattern layer 20 and the upper surface 30a of the modulation layer 30 to an even multiple of λ/4n, where λ is the wavelength of the object light L1 and n is the refractive index of the EO polymer. In addition, when the wavelength of the object light is set to λ=1.55 μm and the refractive index of the EO polymer is set to n=1.60, the following Formula holds.

[Formula 4]

$$\frac{\lambda}{4n} = \frac{1.55 \text{ [μm]}}{4 \times 1.60} = 0.242 \text{ [μm]} \quad (4)$$

Further, when the thickness (height of the pattern portion) tg of the filling portion 31 is set to 0.553 μm and the thickness d of the spacer portion 32 is set to d=m×λ/4n where m is an integer of 1 or more, the total thickness tp of the modulation layer 30 including the spacer portion 32 and the filling portion 31 is obtained as follows.

[Formula 5]

$$tp = 0.553 \text{ [μm]} + m \times \frac{\lambda}{4n} = 0.553 + 0.242 \times m \text{[μm]} \quad (5)$$

Figure 15:
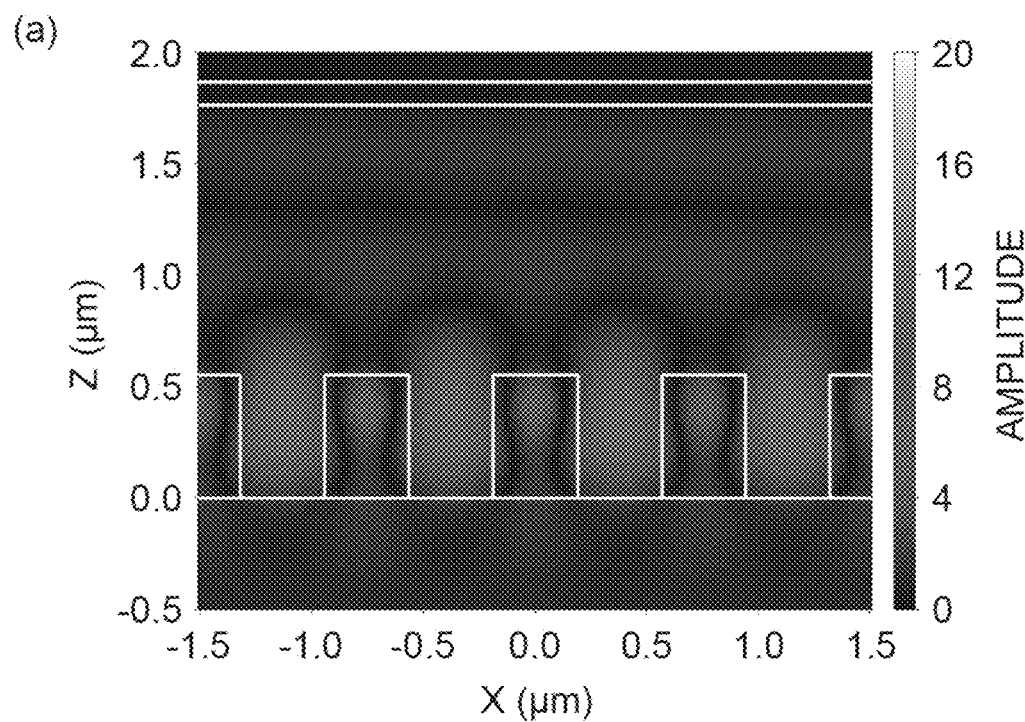
FIG. 15 includes (a), (b) diagrams showing a change of the electric field strength distribution of the modulation object light when a thickness of a modulation layer made of an EO polymer is changed.
Figure 15:
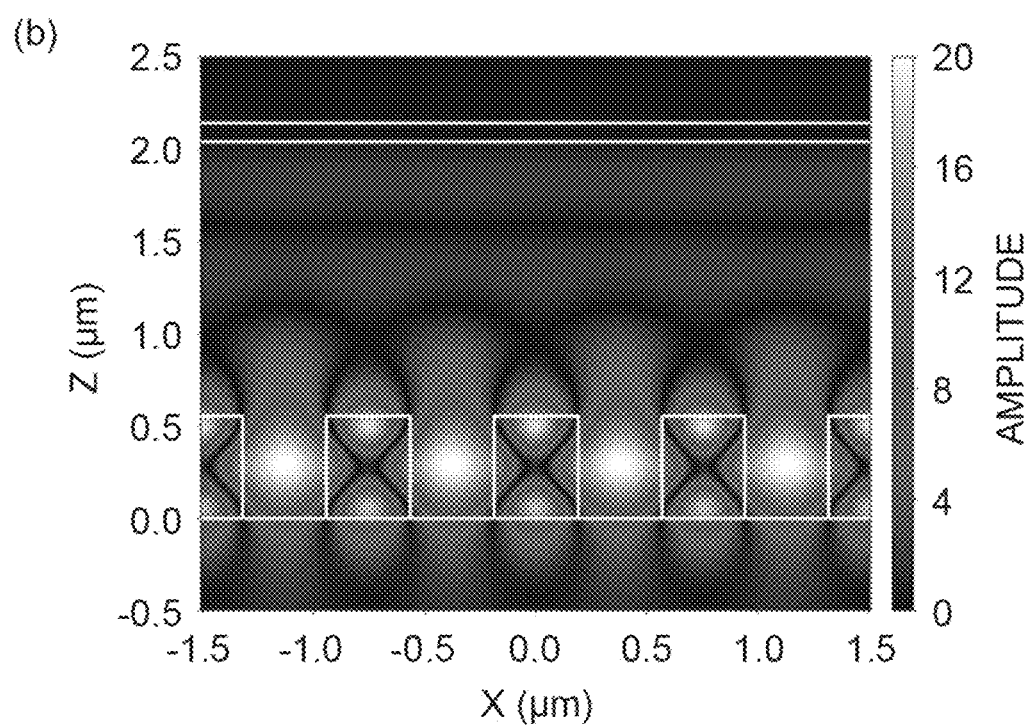
Figure 16:
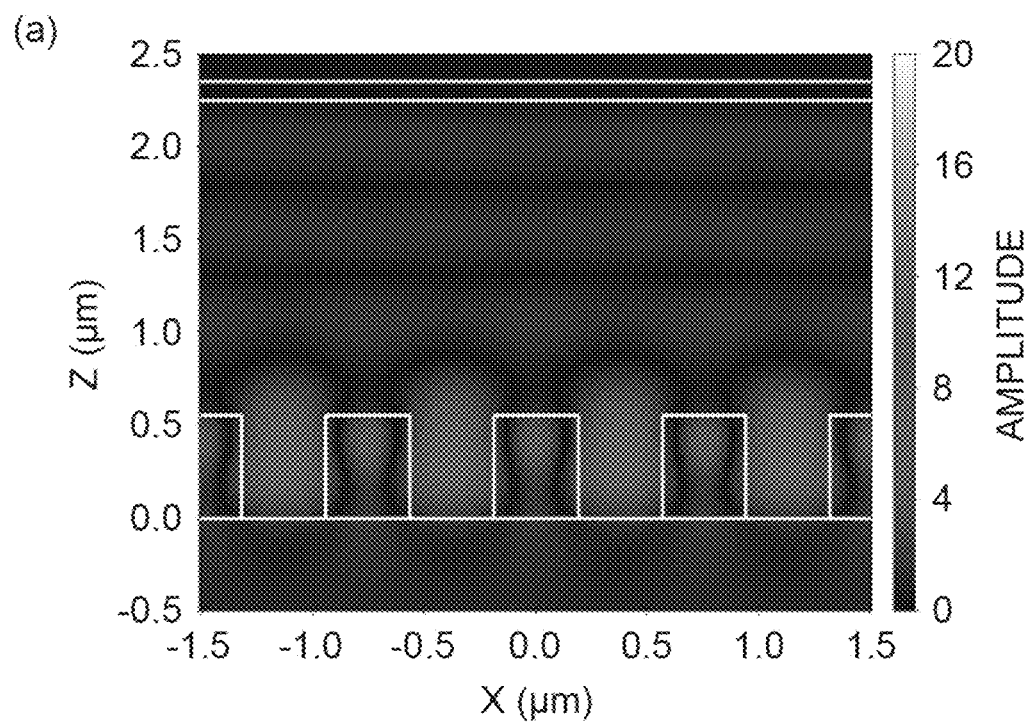
FIG. 16 includes (a), (b) diagrams showing a change of the electric field strength distribution of the modulation object light when the thickness of the modulation layer made of the EO polymer is changed.
Figure 16:
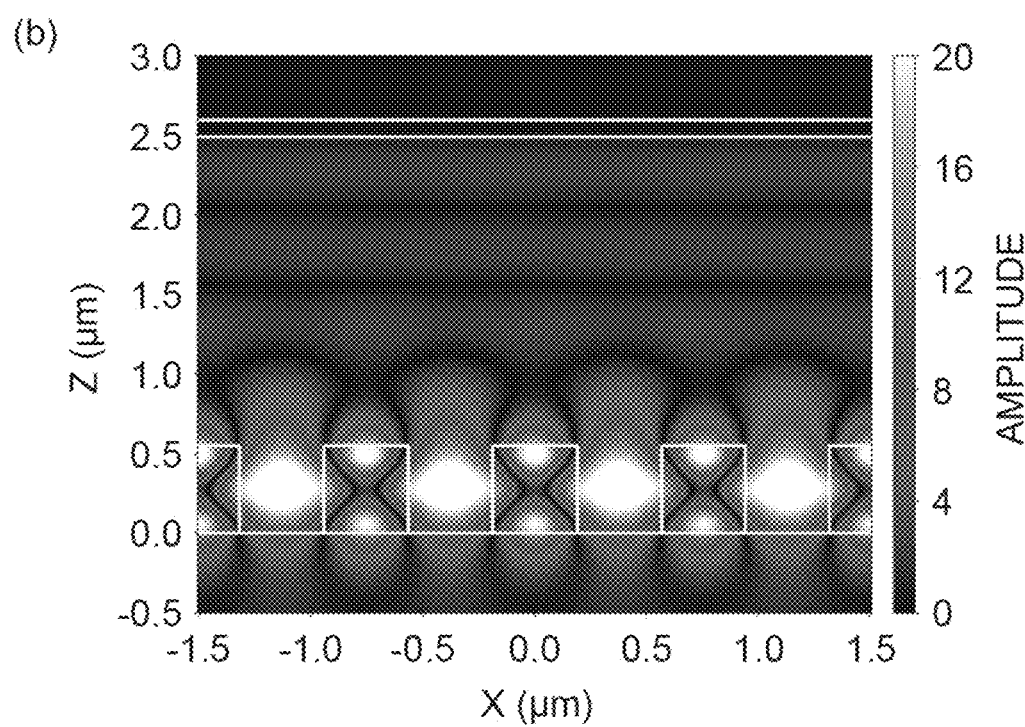

(a) and (b) in FIG. 15 and (a) and (b) in FIG. 16 are diagrams showing the change of the electric field strength distribution of the modulation object light when the thickness of the modulation layer 30 made of the EO polymer is changed. (a) in FIG. 15 shows the electric field strength distribution diagram when d=5×λ/4n and tp=1764 nm. (b) in FIG. 15 shows the electric field strength distribution diagram when d=6×λ/4n and tp=2006 nm. (a) in FIG. 16 shows the electric field strength distribution diagram when d=7×λ/4n and tp=2248 nm. (b) in FIG. 16 shows the electric field strength distribution diagram when d=8×λ/4n and tp=2491 nm.

As shown in the electric field strength distribution diagrams in FIG. 15 and FIG. 16, by setting the thickness d of the spacer portion 32 in the modulation layer 30 to an even multiple of λ/4n (integer multiple of λ/2n), the confinement effect of light in the modulation layer 30 can be improved. Further, by the above configuration, the phase modulation of the object light by the modulation layer 30 can be suitably realized.

A specific configuration of the light modulator will be further described together with modifications of the above configuration.

Figure 17:
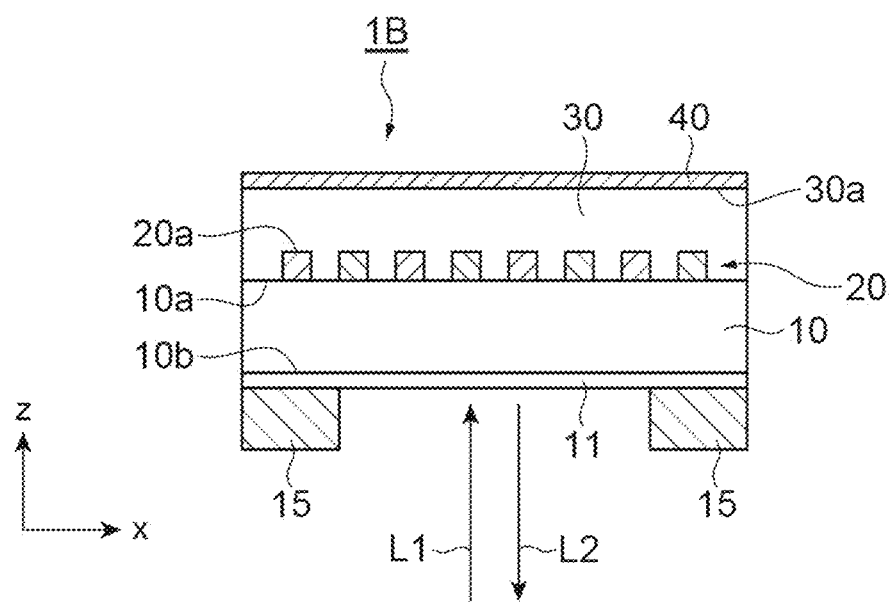
FIG. 17 is a cross-sectional side view illustrating a configuration of a first modification of the light modulator.

FIG. 17 is an xz cross-sectional side view illustrating a configuration of a first modification of the light modulator illustrated in FIG. 1 and FIG. 2. In the light modulator 1B according to the present configuration example, an anti-reflection film 11 is formed on the lower surface 10b of the base layer 10 for reducing the reflectance for the object light L1 being incident from the lower surface 10b, in addition to the configuration of the light modulator 1A. By the above configuration, the incident efficiency of the object light L1 into the light modulator 1B can be improved.

As the anti-reflection film 11, specifically, for example, a dielectric multilayer film can be used. In addition, as an example of the configuration of the anti-reflection film 11, a dielectric multilayer film including six layers of a Nb₂O₅ layer with a thickness of 364.46 nm, a SiO₂ layer with a thickness of 167.36 nm, a Nb₂O₅ layer with a thickness of 270.83 nm, a SiO₂ layer with a thickness of 106.58 nm, a Nb₂O₅ layer with a thickness of 34.5 nm, and a SiO₂ layer with a thickness of 9.62 nm is assumed.

Figure 18:
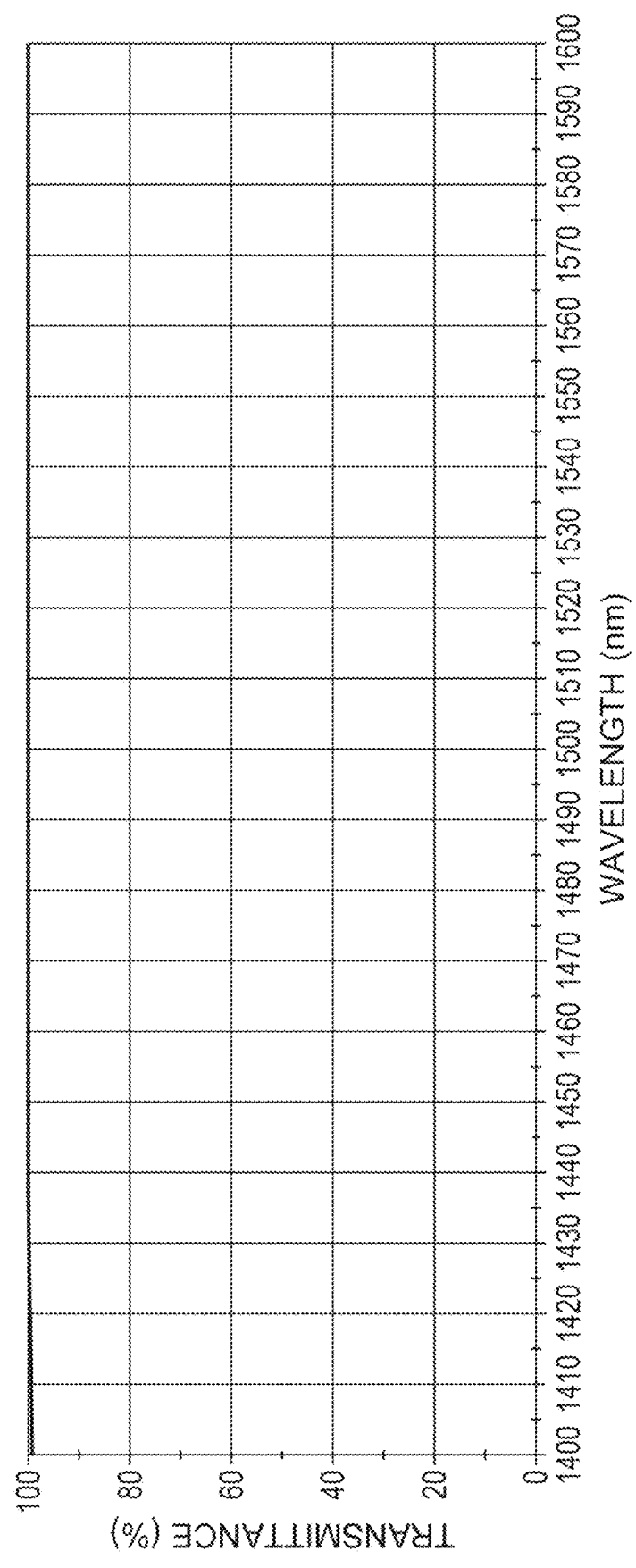
FIG. 18 is a graph showing wavelength dependency of a light transmittance in an anti-reflection film of the light modulator illustrated in FIG. 17.

FIG. 18 is a graph showing wavelength dependency of the light transmittance in the anti-reflection film 11 of the light modulator 1B illustrated in FIG. 17, and shows the transmittance property when the dielectric multilayer film of the above-described configuration is used as the anti-reflection film. In the graph of FIG. 18, the horizontal axis indicates the wavelength (nm) of the modulation object light, and the vertical axis indicates the transmittance (%) of the object light. In the graph of FIG. 18, in a region where the wavelength of the object light is 1400 nm to 1600 nm, the light reflectance in the SiO₂ base layer 10 is 0.5% or less. Thus, when the light modulator of the above configuration is used for, for example, sweeping of laser light in laser processing, phase modulation, and the like, the use efficiency of light can be increased.

Figure 19:
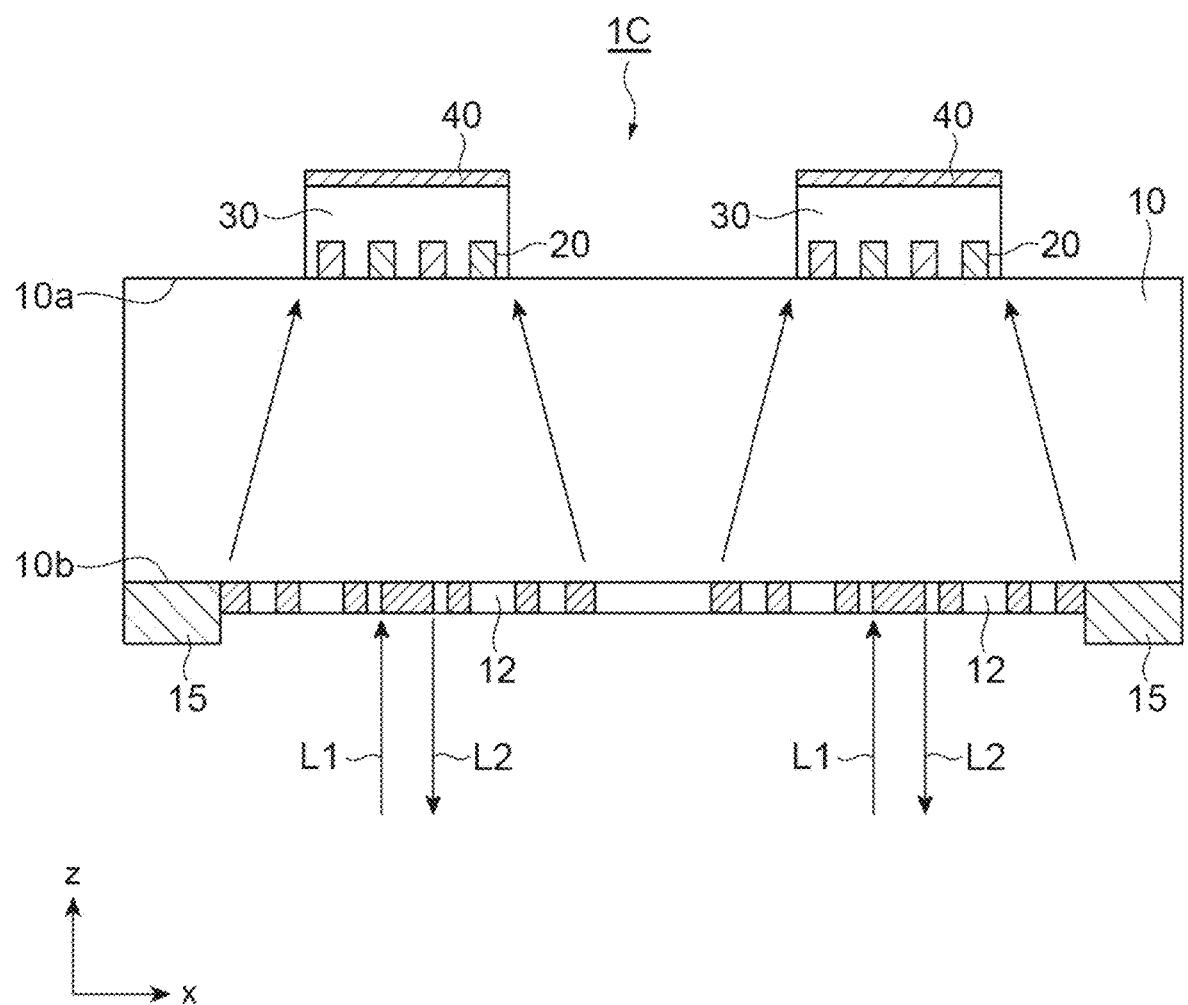
FIG. 19 is a cross-sectional side view illustrating a configuration of a second modification of the light modulator.

FIG. 19 is an xz cross-sectional side view illustrating a configuration of a second modification of the light modulator illustrated in FIG. 1 and FIG. 2. In the light modulator 1C according to the present configuration example, a metalens 12 for focusing the object light L1 being incident from the lower surface 10b onto the modulation region including the modulation layer 30 is formed on the lower surface 10b of the base layer 10, in addition to the configuration of the light modulator 1A. The above metalens 12 can be formed by, for example, depositing a Si layer on the lower surface 10b of the SiO₂ base layer 10 by sputtering, and applying microfabrication to the Si layer to provide a lens function. Further, in the configuration example illustrated in FIG. 19, two modulation cells each including the conductive pattern layer 20, the modulation layer 30, and the reflection layer 40 are formed on the base layer 10, and the metalens 12 is provided for each of the modulation cells.

In addition, the metalens will be briefly described. The metalens is a static optical element for modulating a transmitting intensity or a phase of incident light by using a structure smaller than a wavelength, and for example, it is configured by arranging a plurality of unit cells, each unit cell being an Si layer having a cylindrical shape of a wavelength size or less on a SiO$_2$ substrate that is easy to fabricate. For example, when the Si cylindrical shapes of the respective unit cells are configured and arranged so as to have a phase distribution such as a blazed diffraction grating, the obtained Si microstructure functions as a diffraction grating.

Figure 20:
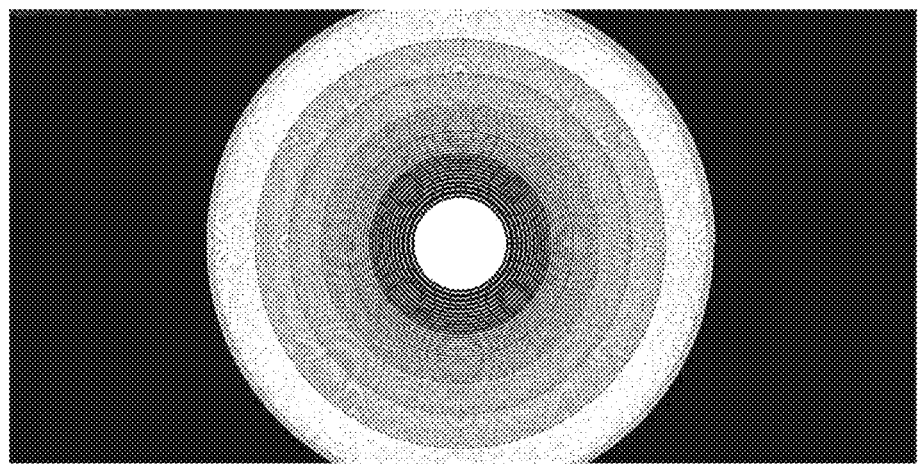
FIG. 20 includes (a), (b) diagrams showing a design example of a metalens formed on a lower surface of a base layer in the light modulator illustrated in FIG. 19.
Figure 20:
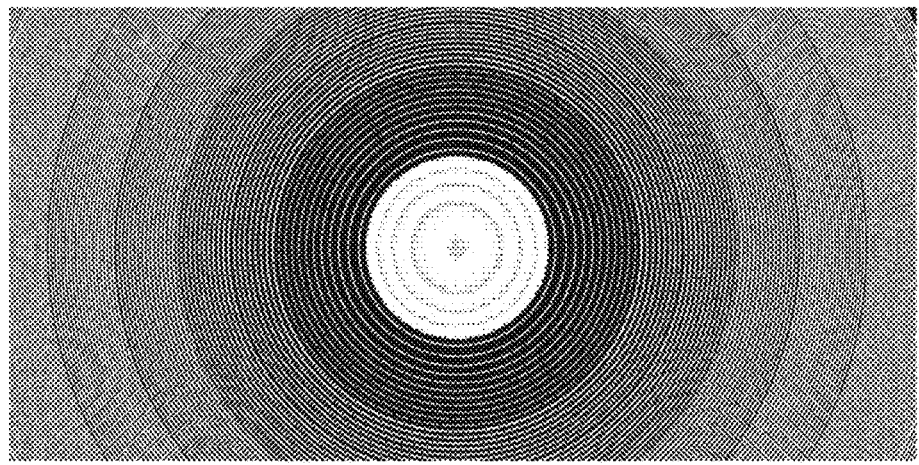
Figure 21:
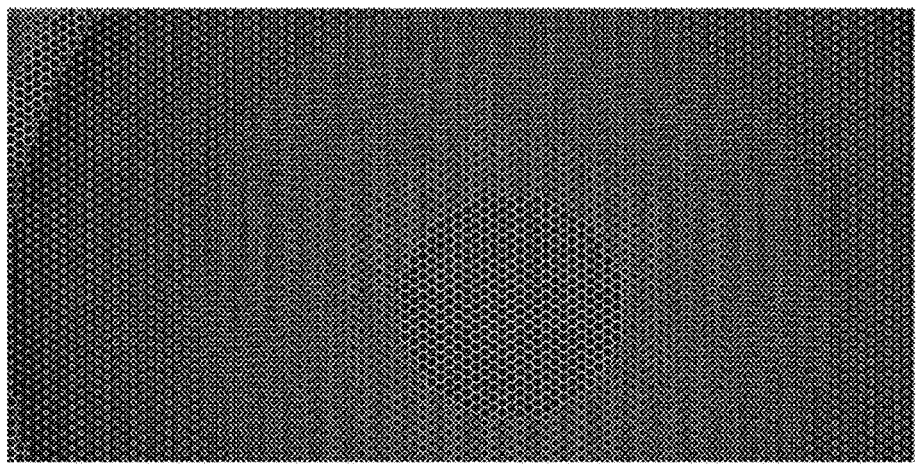
FIG. 21 includes (a), (b) diagrams showing the design example of the metalens formed on the lower surface of the base layer in the light modulator illustrated in FIG. 19.
Figure 21:
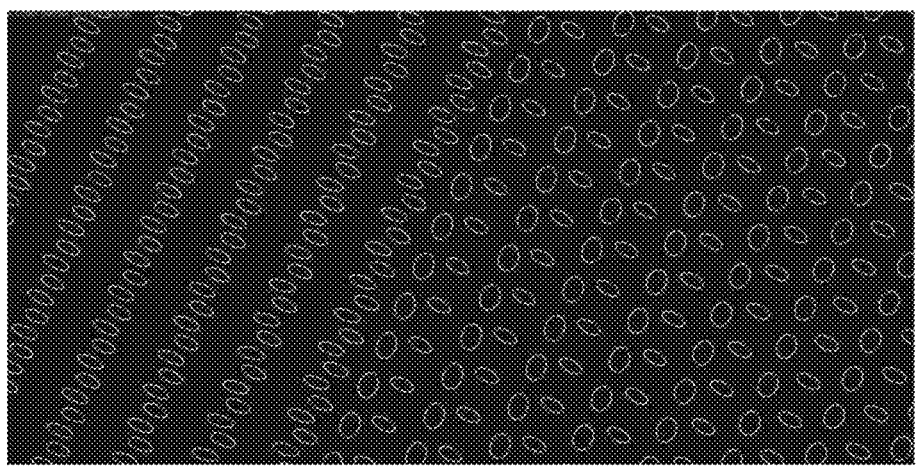

(a) and (b) in FIG. 20 and (a) and (b) in FIG. 21 are diagrams showing a design example of the metalens 12 formed on the lower surface 10*b* of the base layer 10 in the light modulator 1C illustrated in FIG. 19. (b) in FIG. 20 is an enlarged view of the design example of the metalens shown in (a) in FIG. 20. Further, (a) in FIG. 21 is an enlarged view of a central portion of the metalens shown in FIG. 20, and (b) in FIG. 21 is an enlarged view of a peripheral portion.

Figure 22:
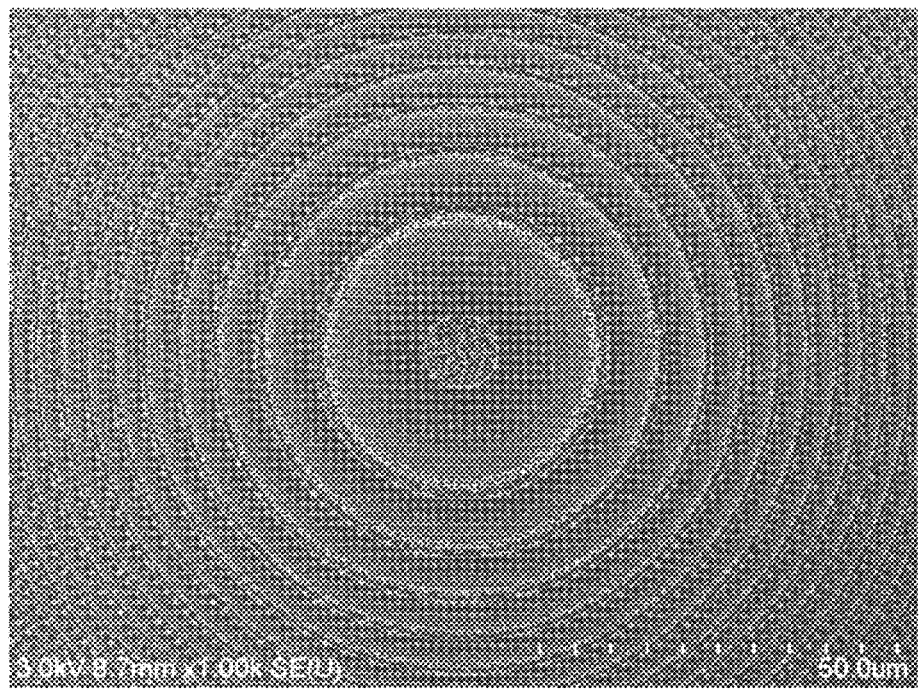
FIG. 22 is a SEM image showing a fabrication example of the metalens in the light modulator illustrated in FIG. 19.

Further, FIG. 22 is a SEM image showing a fabrication example of the metalens 12. In this case, the Si layer with a thickness of 750 nm is formed on the SiO$_2$ substrate serving as the base layer 10, and the metalens is formed by arranging the plurality of unit cells obtained by processing Si into the cylindrical shapes by the microfabrication process. Specifically, eight types of the unit cells having different diameters of the Si cylindrical shapes are used, and the metalens is configured by arranging the unit cells such that the phase distribution is represented by the following Formula (6) of the Fresnel lens.

[Formula 6]

$$\varphi(r) = -\frac{2\pi}{\lambda}\left(\sqrt{r^2 + f^2} - f\right) \quad (6)$$

In the metalens of the example shown in FIG. 20 to FIG. 22, the wavelength of the object light is set to λ=1300 nm, the size of the unit cell is set to 350 nm, and the diameters of the Si cylindrical shapes in the eight types of the unit cells are respectively set to 130 nm, 160 nm, 200 nm, 220 nm, 260 nm, 280 nm, 300 nm, and 320 nm. In the above configuration, the phase changes of light being transmitted through each unit cell (subwavelength element) are 0π, π/4, π/2, 3π/4, π, 5π/4, 3π/2, and 7π/4. Further, in this case, the focal length of the metalens is set to f=650 µm, and the lens radius is set to r=60 µm.

As illustrated in FIG. 19, by providing the metalens 12 on the lower surface 10*b* of the base layer 10 for the modulation cell including the conductive pattern layer 20, the modulation layer 30, and the reflection layer 40 provided on the upper surface 10*a* of the base layer 10, it is possible to guide the light to the more miniaturized modulation cell, thereby further increasing integration and speed of the light modulator.

A configuration of a light modulator array using the light modulator of the above configuration will be described. The light modulator array may be configured by using a plurality of light modulators, being unit modulation cells, each having the above configuration, and arranging the plurality of light modulators in a one-dimensional or two-dimensional array. Specifically, for example, in the light modulator array, with M being an integer of 1 or more and N being an integer of 2 or more, the plurality of light modulators (plurality of modulation cells) may be arranged in a one-dimensional or two-dimensional array in M rows and N columns. According to the above configuration, it is possible to suitably realize the phase modulation of the object light by the one-dimensional or two-dimensional modulation pattern using the light modulator of the above configuration as the modulation pixel.

Figure 23:
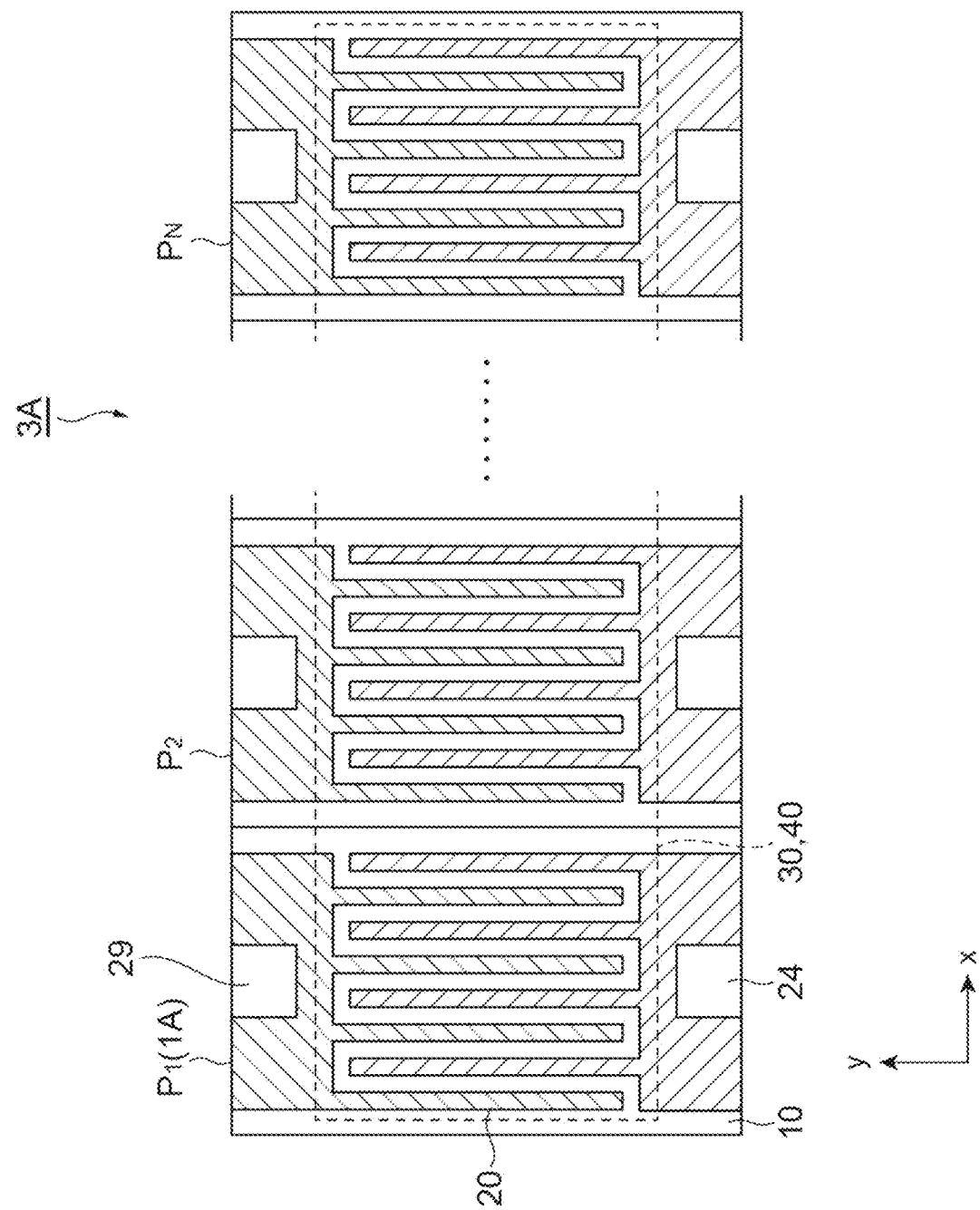
FIG. 23 is a plan view illustrating a configuration of a one-dimensional light modulator array using the light modulator illustrated in FIG. 1.

FIG. 23 is a plan view illustrating a configuration of a one-dimensional light modulator array using the light modulator illustrated in FIG. 1. The light modulator array 3A in the present configuration example uses the light modulators 1A, each having the configuration illustrated in FIG. 1 and FIG. 2 and including the base layer 10, the conductive pattern layer 20, the modulation layer 30, and the reflection layer 40, as N modulation cells $P_1$ to $P_N$, and is configured by arranging the modulation cells in a one-dimensional array with the x-axis direction as the arrangement direction.

In addition, in the present configuration example, the modulation layer 30 and the reflection layer 40 are integrally formed for all of the N modulation cells $P_1$ to $P_N$ as indicated by a dashed line in FIG. 23. Further, the base layer 10 may be individually provided for the N modulation cells $P_1$ to $P_N$ or may be integrally provided.

Figure 24:
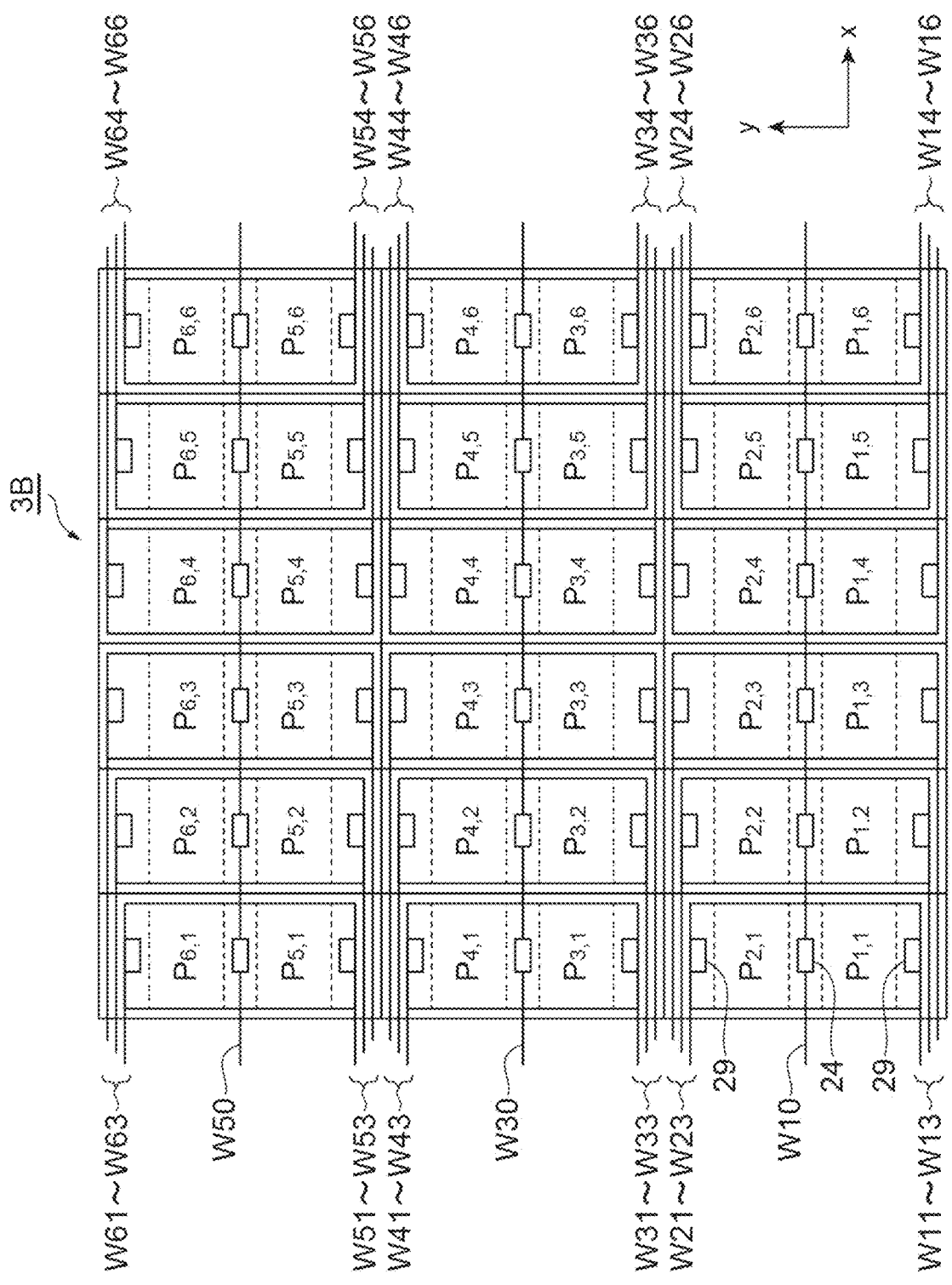
FIG. 24 is a plan view illustrating a configuration of a two-dimensional light modulator array using the light modulator illustrated in FIG. 1.
Figure 25:
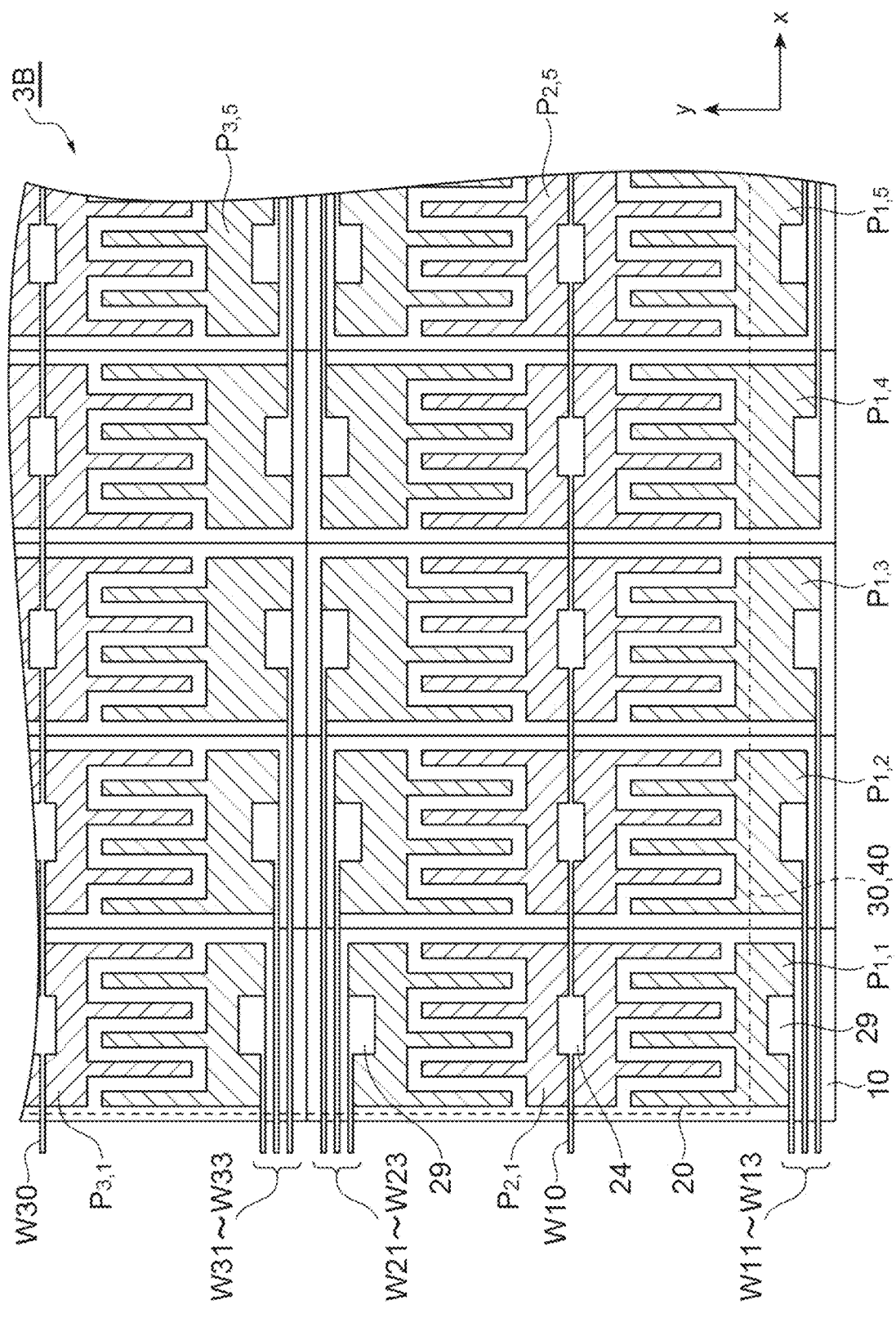
FIG. 25 is a partially enlarged plan view illustrating the configuration of the two-dimensional light modulator array illustrated in FIG. 24.

FIG. 24 is a plan view illustrating a configuration of a two-dimensional light modulator array using the light modulator illustrated in FIG. 1, and FIG. 25 is a partially enlarged plan view illustrating the configuration of the two-dimensional light modulator array illustrated in FIG. 24. The light modulator array 3B in the present configuration example uses the light modulators 1A, each having the configuration illustrated in FIG. 1 and FIG. 2 and including the base layer 10, the conductive pattern layer 20, the modulation layer 30, and the reflection layer 40, as 6×6 modulation cells $P_{1,1}$ to $P_{6,6}$, and is configured by arranging the modulation cells in a two-dimensional array with the x-axis direction and the y-axis direction as the arrangement directions. In addition, in FIG. 24, the modulation layer 30 and the reflection layer 40 are not illustrated.

In the light modulator array 3B of the present configuration example, in the modulation cells $P_{1,1}$ to $P_{1,6}$ and $P_{2,1}$ to $P_{2,6}$ of the first and second rows, the first electrode 24 is provided in common for the modulation cells $P_{1,n}$ and $P_{2,n}$ in each column, and a common ground line W10 is connected to these first electrodes 24. Further, for the modulation cells $P_{1,1}$ to $P_{1,6}$ of the first row, individual modulation signal lines W11 to W13 and W14 to W16 are connected to the second electrodes 29 of the modulation cells of the respective columns. Further, for the modulation cells $P_{2,1}$ to $P_{2,6}$ of the second row, individual modulation signal lines W21 to W23 and W24 to W26 are connected to the second electrodes 29 of the modulation cells of the respective columns.

Further, in the modulation cells $P_{3,1}$ to $P_{3,6}$ and $P_{4,1}$ to $P_{4,6}$ of the third and fourth rows, the first electrode 24 is provided in common for the modulation cells $P_{3,n}$ and $P_{4,n}$ in each column, and a common ground line W30 is connected to these first electrodes 24. Further, for the modulation cells $P_{3,1}$ to $P_{3,6}$ of the third row, individual modulation signal lines W31 to W33 and W34 to W36 are connected to the second electrodes 29 of the modulation cells of the respective columns. Further, for the modulation cells $P_{4,1}$ to $P_{4,6}$ of the fourth row, individual modulation signal lines W41 to W43 and W44 to W46 are connected to the second electrodes 29 of the modulation cells of the respective columns.

Further, in the modulation cells $P_{5,1}$ to $P_{5,6}$ and $P_{6,1}$ to $P_{6,6}$ of the fifth and sixth rows, the first electrode 24 is provided in common for the modulation cells $P_{5,n}$ and $P_{6,n}$ in each column, and a common ground line W50 is connected to these first electrodes 24. Further, for the modulation cells $P_{5,1}$ to $P_{5,6}$ of the fifth row, individual modulation signal lines W51 to W53 and W54 to W56 are connected to the second electrodes 29 of the modulation cells of the respective columns. Further, for the modulation cells $P_{6,1}$ to $P_{6,6}$ of the sixth row, individual modulation signal lines W61 to W63 and W64 to W66 are connected to the second electrodes 29 of the modulation cells of the respective columns.

In addition, in the present configuration example, the modulation layer 30 and the reflection layer 40 are integrally formed for all of the 6×6 modulation cells $P_{1,1}$ to $P_{6,6}$ as indicated by a dashed line in FIG. 25. Further, the base layer 10 may be individually provided for the 6×6 modulation cells $P_{1,1}$, to $P_{6,6}$ or may be integrally provided.

The light modulator and the light modulator array are not limited to the embodiments and configuration examples described above, and various modifications are possible. For example, as to the plurality of pattern portions in the conductive pattern layer 20, in the above embodiment, the configuration in which the first pattern portions to which the first voltage is applied and the second pattern portions to which the second voltage is applied are alternately arranged is used, and further, it is not limited to the above configuration, and specifically, various patterns may be used.

The light modulator of the above embodiment includes (1) a base layer made of an insulating material having a transmitting property for object light being a modulation object and on which the object light is incident from a lower surface; (2) a conductive pattern layer made of a conductive material, including a plurality of pattern portions arranged periodically in a first direction perpendicular to a thickness direction of the base layer, and formed on an upper surface of the base layer; (3) a modulation layer made of an electro-optic polymer, filling a space between the plurality of pattern portions and formed on an upper surface of the conductive pattern layer with a predetermined thickness, and having a refractive index to be changed by applying an electric field using the conductive pattern layer; and (4) a reflection layer formed on an upper surface of the modulation layer and reflecting the object light being incident from the lower surface of the base layer and transmitted through the modulation layer toward the base layer, and (5) the object light having a phase modulated by being transmitted through the modulation layer, and reflected by the reflection layer is output from the lower surface of the base layer to the outside as modulated light.

In the above light modulator, an arrangement period of the plurality of pattern portions in the conductive pattern layer may be set to be less than a wavelength of the object light. As described above, by using the subwavelength structure (metasurface structure) in which the arrangement period is set to be smaller than the object wavelength in the plurality of pattern portions of the conductive pattern layer arranged on the base layer and the modulation layer of the EO polymer filling between the plurality of pattern portions, phase modulation of the object light by the EO polymer of the modulation layer can be suitably realized.

As to the configuration of the conductive pattern layer used for applying the electric field to the modulation layer, specifically, for example, the conductive pattern layer may be configured such that first pattern portions each extending in a second direction perpendicular to the thickness direction and the first direction and to which a first voltage is applied and second pattern portions each extending in the second direction and to which a second voltage different from the first voltage is applied are arranged alternately in the first direction as the plurality of pattern portions. According to the above configuration, the periodic arrangement structure by the conductive pattern layer and the modulation layer on the base layer can be suitably realized.

In the above light modulator, when a wavelength of the object light is set to λ and a refractive index of the electro-optic polymer is set to n, a thickness d of the modulation layer between the upper surface of the conductive pattern layer and the upper surface of the modulation layer may be set to an even multiple of λ/4n. In this case, the modulation layer can suitably function as the optical resonator for the object light.

As to the materials of the respective layers constituting the above light modulator, for example, the conductive material of the conductive pattern layer may be a semiconductor material. Further, the reflection layer may be a metal layer made of a metal material.

In the above light modulator, an anti-reflection film for reducing a reflectance for the object light may be formed on the lower surface of the base layer. Further, a metalens for focusing the object light being incident from the lower surface may be formed on the lower surface of the base layer. Further, in the above light modulator, a wavelength of the object light may be 1 μm or more and 15 μm or less.

The light modulator array of the above embodiment includes a plurality of light modulators each having the above configuration, and the plurality of light modulators are arranged in a one-dimensional or two-dimensional array. Further, specifically, for example, in the light modulator array, with M being an integer of 1 or more and N being an integer of 2 or more, the plurality of light modulators may be arranged in a one-dimensional or two-dimensional array in M rows and N columns. According to the above configuration, it is possible to suitably realize phase modulation of the object light by a one-dimensional or two-dimensional modulation pattern using the light modulator having the above configuration as the modulation cell (modulation pixel).

INDUSTRIAL APPLICABILITY

The embodiments can be used as a light modulator and a light modulator array capable of modulating a phase of modulation object light at high speed.

REFERENCE SIGNS LIST 1A, 1B, 1C—light modulator, 2A—light modulation apparatus, 3A, 3B—light modulator array, 10—base layer, 10a—upper surface, 10b—lower surface, 11—anti-reflection film, 12—metalens, 14, 19—wire, 15—mount,
20—conductive pattern layer, 20a—upper surface, 21—first pattern portion, 22—first connection pattern portion, 23—first electrode pattern portion, 24—first electrode, 26—second pattern portion, 27—second connection pattern portion, 28—second electrode pattern portion, 29—second electrode, 30—modulation layer, 30a—upper surface, 31—filling portion, 32—spacer portion, 40—reflection layer,
51—voltage application unit, 52—control unit, $P_1$-$P_N$, $P_{1,1}$-$P_{6,6}$—modulation cell, W10, W30, W50—ground line, W11-W66—modulation signal line, L1—object light, L2—modulated light.

The invention claimed is:

1. A light modulator comprising:
   a base layer made of an insulating material having a transmitting property for object light being a modulation object and on which the object light is incident from a lower surface;
   a conductive pattern layer made of a conductive material, including a plurality of pattern portions arranged periodically in a first direction perpendicular to a thickness direction of the base layer, and formed on an upper surface of the base layer;
   a modulation layer made of an electro-optic polymer, configured to fill a space between the plurality of pattern portions and formed on an upper surface of the conductive pattern layer with a predetermined thickness, and having a refractive index to be changed by applying an electric field using the conductive pattern layer; and
   a reflection layer formed on an upper surface of the modulation layer and reflecting configured to reflect the object light being incident from the lower surface of the base layer and transmitted through the modulation layer toward the base layer, wherein
   the object light having a phase modulated by being transmitted through the modulation layer, and reflected by the reflection layer is output from the lower surface of the base layer to the outside as modulated light.

2. The light modulator according to claim 1, wherein an arrangement period of the plurality of pattern portions in the conductive pattern layer is set to be less than a wavelength of the object light.

3. The light modulator according to claim 1, wherein the conductive pattern layer is configured such that first pattern portions each extending in a second direction perpendicular to the thickness direction and the first direction and to which a first voltage is applied and second pattern portions each extending in the second direction and to which a second voltage different from the first voltage is applied are arranged alternately in the first direction as the plurality of pattern portions.

4. The light modulator according to claim 1, wherein, when a wavelength of the object light is set to $\lambda$ and a refractive index of the electro-optic polymer is set to n, a thickness d of the modulation layer between the upper surface of the conductive pattern layer and the upper surface of the modulation layer is set to an even multiple of $\lambda/4n$.

5. The light modulator according to claim 1, wherein the conductive material of the conductive pattern layer is a semiconductor material.

6. The light modulator according to claim 1, wherein the reflection layer is made of a metal material.

7. The light modulator according to claim 1, wherein an anti-reflection film configured to reduce a reflectance for the object light is formed on the lower surface of the base layer.

8. The light modulator according to claim 1, wherein a metalens configured to focus the object light being incident from the lower surface is formed on the lower surface of the base layer.

9. The light modulator according to claim 1, wherein a wavelength of the object light is 1 µm or more and 15 µm or less.

10. A light modulator array comprising a plurality of light modulators each according to claim 1, wherein
    the plurality of light modulators are arranged in a one-dimensional or two-dimensional array.

* * * * *